(12) United States Patent
Kornilov et al.

(10) Patent No.: US 11,680,963 B2
(45) Date of Patent: Jun. 20, 2023

(54) METHOD AND APPARATUS FOR EXAMINING A MEASURING TIP OF A SCANNING PROBE MICROSCOPE

(71) Applicant: Carl Zeiss SMT GmbH, Oberkochen (DE)

(72) Inventors: Kinga Kornilov, Rossdorf (DE); Christof Baur, Darmstadt (DE); Markus Bauer, Rossdorf (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

(21) Appl. No.: 17/551,613

(22) Filed: Dec. 15, 2021

(65) Prior Publication Data

US 2022/0107340 A1 Apr. 7, 2022

Related U.S. Application Data

(63) Continuation of application No. 16/736,360, filed on Jan. 7, 2020, now Pat. No. 11,237,187, which is a
(Continued)

(30) Foreign Application Priority Data

Jul. 12, 2017 (DE) .......................... 102017211957.8

(51) Int. Cl.
*G01Q 70/06* (2010.01)
*G01Q 30/02* (2010.01)
(Continued)

(52) U.S. Cl.
CPC ............ *G01Q 70/06* (2013.01); *G01Q 30/02* (2013.01); *G01Q 40/02* (2013.01); *G01Q 70/08* (2013.01); *G01Q 20/02* (2013.01)

(58) Field of Classification Search
CPC ........ G01Q 20/02; G01Q 30/02; G01Q 40/02; G01Q 70/06; G01Q 70/08; G01B 7/34
See application file for complete search history.

(56) References Cited

U.S. PATENT DOCUMENTS 5,578,745 A * 11/1996 Bayer .................... G01Q 40/02
73/1.73
5,960,255 A * 9/1999 Bartha ................... G01Q 40/02
250/307
(Continued)

FOREIGN PATENT DOCUMENTS

| CN | 101395676 A | 3/2009 | ............. G12B 21/20 |
| CN | 101473384 A | 7/2009 | ............. G12B 21/20 |

(Continued)

OTHER PUBLICATIONS

Hubner et al, "Downwards to Metrology in Nanoscale; Determination of the AFM Tip Shape With Well-Known Sharp-Edged Calibration Structures", Appl. Phys. A. 76, 913-917 (Year: 2003).*
(Continued)

*Primary Examiner* — David E Smith
(74) *Attorney, Agent, or Firm* — Fish & Richardson P.C.

(57) ABSTRACT

The present invention relates to a method for examining a measuring tip of a scanning probe microscope, wherein the method includes the following steps: (a) generating at least one test structure before a sample is analyzed, or after said sample has been analyzed, by the measuring tip; and (b) examining the measuring tip with the aid of the at least one generated test structure.

21 Claims, 15 Drawing Sheets

Related U.S. Application Data continuation of application No. PCT/EP2018/067835, filed on Jul. 2, 2018.

(51) Int. Cl.
  *G01Q 70/08* (2010.01)
  *G01Q 40/02* (2010.01)
  *G01Q 20/02* (2010.01)

(56) References Cited

U.S. PATENT DOCUMENTS

| | | | |
|---|---|---|---|
| 6,218,264 B1 | 4/2001 | Bartha et al. | |
| 7,096,711 B2 | 8/2006 | Chand et al. | |
| 8,650,661 B2 * | 2/2014 | Dahlen | G01Q 40/02 850/10 |
| 8,739,310 B2 * | 5/2014 | Foucher | G01Q 40/00 850/19 |
| 9,659,768 B2 | 5/2017 | Yu et al. | |
| 9,721,754 B2 | 8/2017 | Bret et al. | |
| 11,237,187 B2 * | 2/2022 | Kornilov | G01Q 70/08 |
| 2002/0062572 A1 * | 5/2002 | Bindell | G01Q 40/02 33/546 |
| 2002/0117611 A1 * | 8/2002 | Kley | G01Q 60/16 977/863 |
| 2005/0252282 A1 * | 11/2005 | Chand | G01Q 40/02 73/105 |
| 2007/0182971 A1 * | 8/2007 | Kubo | G01Q 40/02 356/601 |
| 2008/0308726 A1 | 12/2008 | Jahnke et al. | |
| 2009/0061543 A1 * | 3/2009 | Ukraintsev | H01L 22/12 33/502 |
| 2009/0106868 A1 * | 4/2009 | Foucher | G01Q 40/02 850/8 |
| 2010/0154521 A1 | 6/2010 | Budach | |
| 2010/0313312 A1 | 12/2010 | Dahlen et al. | |
| 2013/0291236 A1 | 10/2013 | Foucher et al. | |
| 2014/0165236 A1 | 6/2014 | Budach et al. | |
| 2015/0169997 A1 | 6/2015 | Weber et al. | |
| 2016/0181094 A1 | 6/2016 | Yu et al. | |
| 2017/0062180 A1 | 3/2017 | Budach et al. | |
| 2017/0261532 A1 * | 9/2017 | Pieper | G01Q 60/24 |
| 2017/0292923 A1 * | 10/2017 | Baralia | G03F 7/7065 |
| 2020/0141972 A1 | 5/2020 | Kornilov et al. | |

FOREIGN PATENT DOCUMENTS

| | | | |
|---|---|---|---|
| CN | 103703415 A | 4/2014 | G03F 1/22 |
| DE | 101 07 796 | 7/2002 | |
| DE | 102006038148 | 4/2007 | |
| DE | 102013225936 | 6/2015 | |
| EP | 0 676 614 | 10/1995 | |
| EP | 2 657 710 | 10/2013 | |
| GB | 2472302 | 2/2011 | |
| JP | 2017-075935 | 4/2017 | |

OTHER PUBLICATIONS

Griffith and Grigg, "Dimensional Metrology with Scanning Probe Microscopes", J. Appl. Phys 74 (9), 1993, p. R83-R109 (Year: 1993).*

Bogdanov et al., "Fabrication of arrays of nanometer size test structures for scanning probe microscope tips characterization", J. Vac. Sci. Technol. B, vol. 12, No. 6, pp. 3681-3684 (Nov./Dec. 1994).

Bukharaev et al., "Three-Dimensional Probe and Surface Reconstruction for Atomic Force Microscopy Using a Deconvolution Algorithm", Scanning Microscopy, vol. 12, No. 1, pp. 225-234 (1998).

Bykov et al., "Test structure for SPM tip shape deconvolution", Applied Physics A, vol. 66, pp. 499-502 (1998).

Colombi et al., "Self-assembled polystyrene nanospheres for the evaluation of atomic force microscopy tip curvature radius", Measurement Science and Technology, vol. 20, pp. 1-9 (2009).

The German Office Action for German Application No. DE 10 2017 211 957.8, dated Feb. 8, 2018.

The International Search Report and Written Opinion of the International Search Authority for International Application No. PCT/EP2018/067835 dated Sep. 18, 2018).

The Notice of Reasons for Rejection issued by the Korean Intellectual Property Office for Korean Application No. 10-2020-7000847, dated Mar. 29, 2021 (with English Translation).

Dahlen et al., "Critical Dimension AFM tip characterization and image reconstruction applied to the 45 nm node", Metrology, Inspection, and Process Control for Microlithography XX, Proc. of SPIE, vol. 6152, pp. 61522R-1-61522R-11 (2006).

Dahlen et al., "Tip characterization and surface reconstruction of complex structures with critical dimension atomic force microscopy", J. Vac. Sci. Technol. B, vol. 23, No. 6, pp. 2297-2303 (Nov./Dec. 2005).

Dixson et al., "Measurement of a CD and Sidewall Angle Artifact with Two Dimensional CD AFM Metrology", SPIE, vol. 2725, pp. 572-588 (1996).

Dixson et al., "Progress on CD-AFM tip width calibration standards", Proc. of SPIE, vol. 8378, pp. 83780B-1-83780B-9 (2012).

Dongmo et al., "Blind restoration method of scanning tunneling and atomic force microscopy images", J. Vac. Sci. Technol. B, vol. 14, No. 2, pp. 1552-1556 (Mar./Apr. 1996).

Frost et al., "AFM tip calibration using nanometer-sized structures induced by ion beam sputtering", Proceedings of SPIE, vol. 4449, pp. 225-234 (2001).

Griffith et al., "Dimensional metrology with scanning probe microscopes", J. App. Phys., vol. 74, No. 9, pp. R83-R109 (Nov. 1, 1993).

Huebner et al., "Downwards to metrology in nanoscale: Determination of the AFM tip shape with well-known sharp-edged calibration structures", Applied Physics A, vol. 76, p. 913-917 (2003).

Markiewicz et al., "Simulation of atomic force microscope tip-sample/sample-tip reconstruction", J. Vac. Sci. Technol. B, vol. 13, No. 3, pp. 1115-1118 (May/Jun. 1995).

Martin et al., "Method for imaging sidewalls by atomic force microscopy", Appl. Phys. Lett., vol. 64, No. 19, pp. 2498-2500 (May 9, 1994).

Martinez et al., "Aspect-ratio and lateral-resolution enhancement in force microscopy by attaching nanoclusters generated by an ion cluster source at the end of a silicon tip", Review of Scientific Instruments, vol. 82, pp. 023710-1-023710-7 (2011).

Moeller et al., "Tunneling tips imaged by scanning tunneling microscopy", J. Vac. Sci. Technol. A, vol. 8, No. 1, pp. 434-437 (Jan./Feb. 1990).

Montelius et al., "Direct observation of the atomic force microscopy tip using inverse atomic force microscopy imaging", J. Vac. Sci. Technol. B, vol. 12, No. 3, pp. 2222-2226 (May/Jun. 1994).

Qian et al., "General three-dimensional image simulation and surface reconstruction in scanning probe microscopy using a dexel representation", Ultramicroscopy, vol. 108, pp. 29-42 (2007).

Qian et al., "Image Simulation and Surface Reconstruction of Undercut Features in Atomic Force Microscopy", Proceedings of SPIE—The International Society for Optical Engineering, vol. 6518 (Mar. 2007).

Reiss et al., "Scanning tunneling microscopy on rough surfaces: Deconvolution of constant current images", Appl. Phys. Lett., vol. 57, No. 9, pp. 867-869 (Aug. 27, 1990).

Romanus et al., "Preparation of defined structures on very thin foils for characterization of AFM probes", ScienceDirect, Microelectronic Engineering, vol. 84, pp. 528-531 (2007).

Schneir et al., "Increasing the value of atomic force microscopy process metrology using a high-accuracy scanner, tip characterization, and morphological image analysis", J. Vac. Sci. Technol. B, vol. 14, No. 2, pp. 1540-1546 (Mar./Apr. 1996).

Udpa et al., "Deconvolution of Atomic Force Microscopy Data for Cellular and Molecular Imaging", IEEE Signal Processing Magazine, pp. 73-83 (May 2006).

Villarrubia, "Algorithms for Scanned Probe Microscope Image Simulation, Surface Reconstruction, and Tip Estimation", Journal of Research of the National Institute of Standards and Technology, vol. 102, No. 4, pp. 425-454 (Jul.-Aug. 1997).

(56) References Cited

OTHER PUBLICATIONS

Williams et al., "Blind reconstruction of scanning probe image data", *J. Vac. Sci. Technol. B*, vol. 14, No. 2, pp. 1557-1562 (Mar./Apr. 1996).
Wong et al., "Tip Dilation and AFM Capabilities in the Characterization of Nanoparticles", Scanning Probe Microscopy for Materials Science, J. O. Min. 59, pp. 12-16 (Jan. 2007).
The First Office Action and Search Report issued by the Chinese Patent Office for Chinese Application No. CN 201880047666.9, dated Feb. 16, 2022 (with English Translation).
The Second Office Action and Search Report issued by the China National Intellectual Property Administration for Application No. CN 201880047666.9, dated Nov. 9, 2022 (with English Translation).

\* cited by examiner

Fig. 1
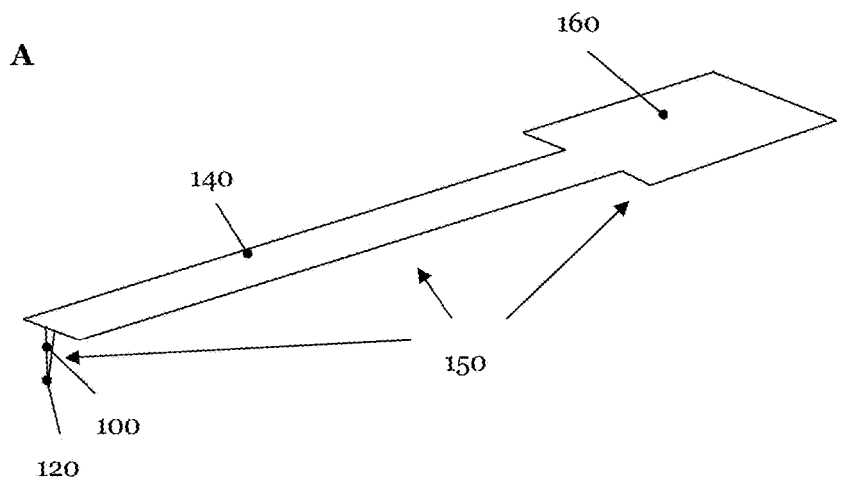
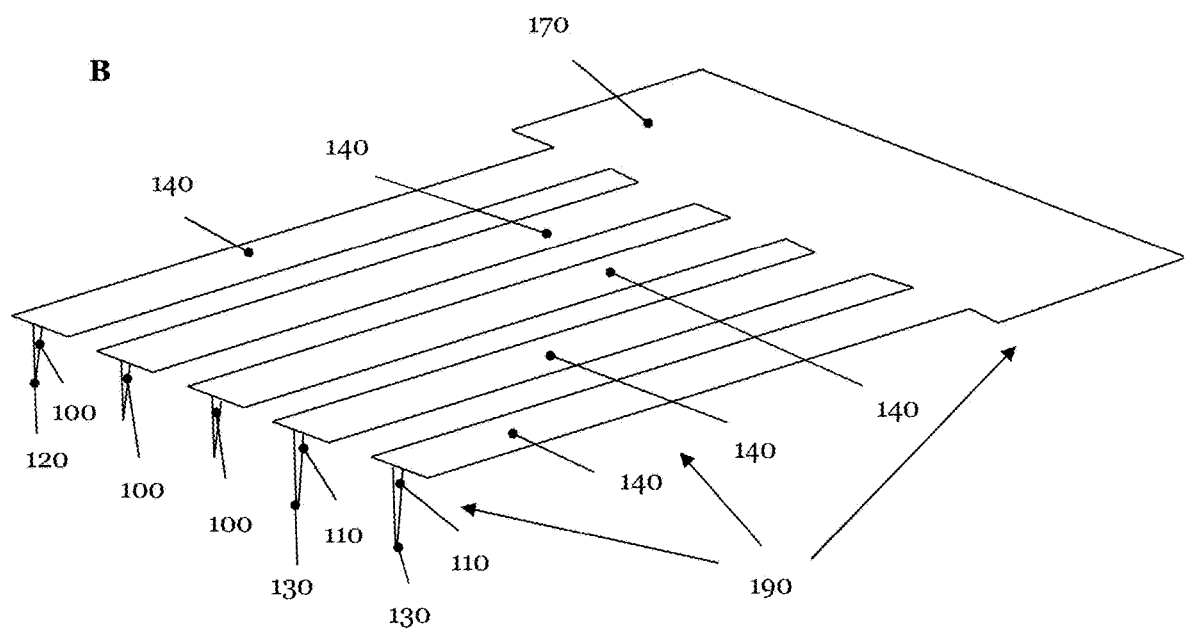

Fig. 8
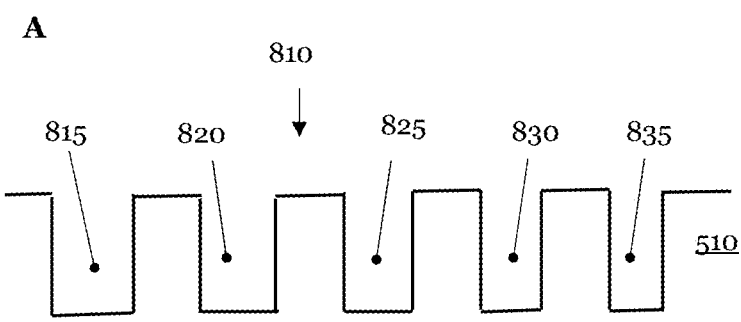
A
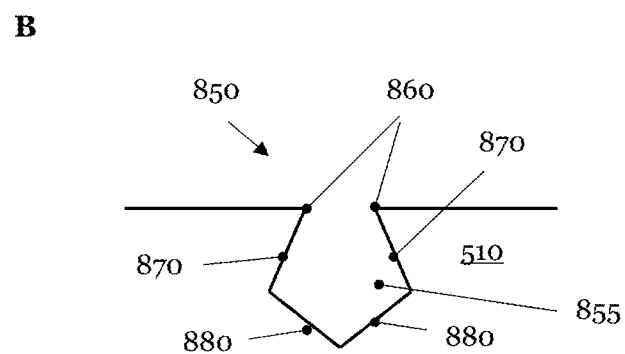
B

Fig. 10
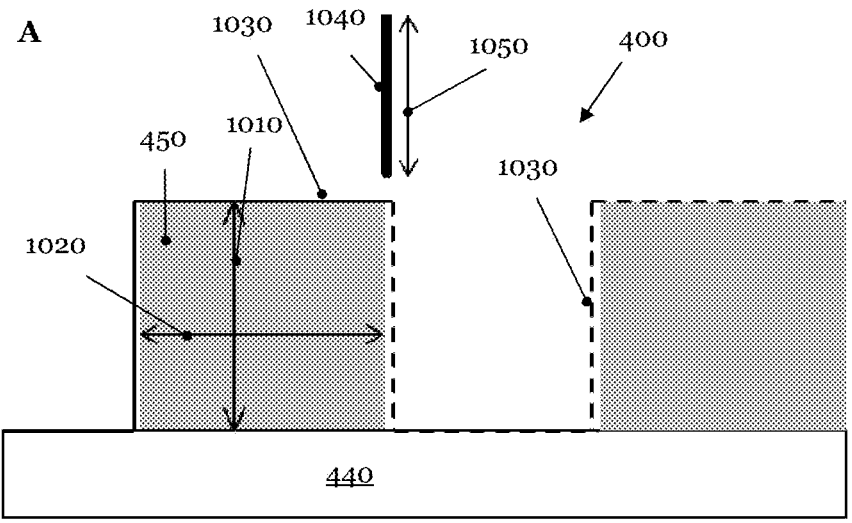
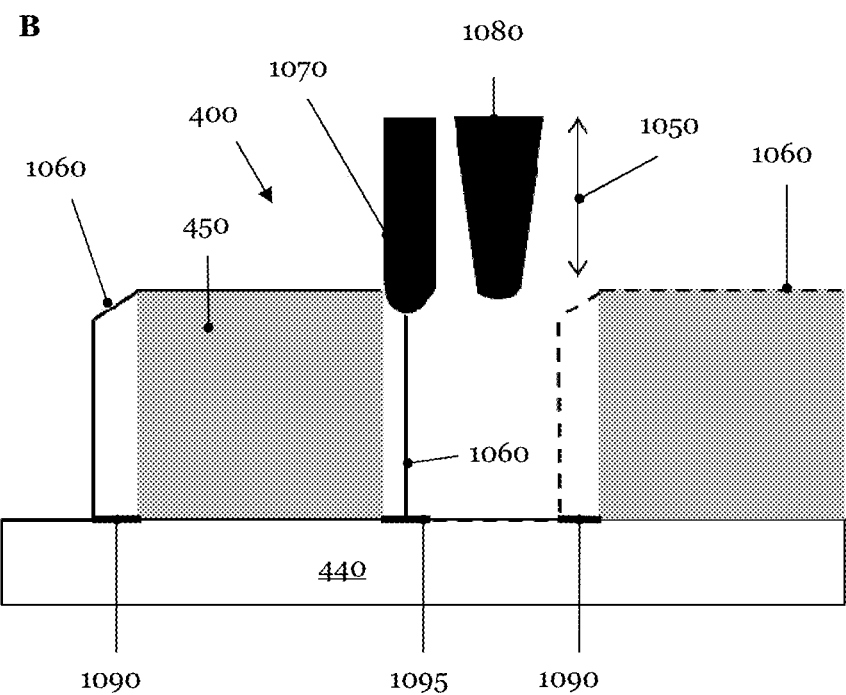

Fig. 13
A
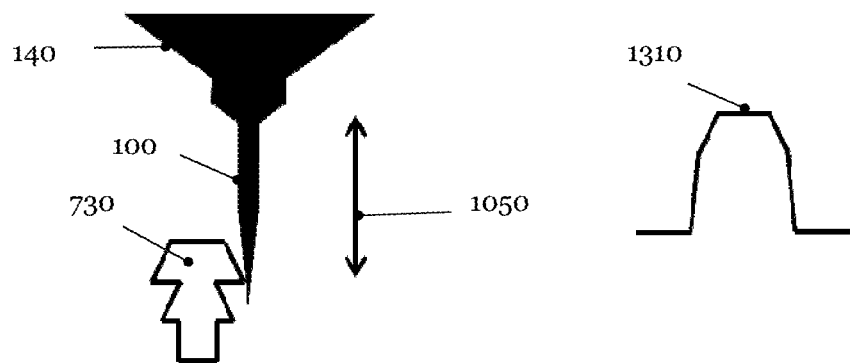
B
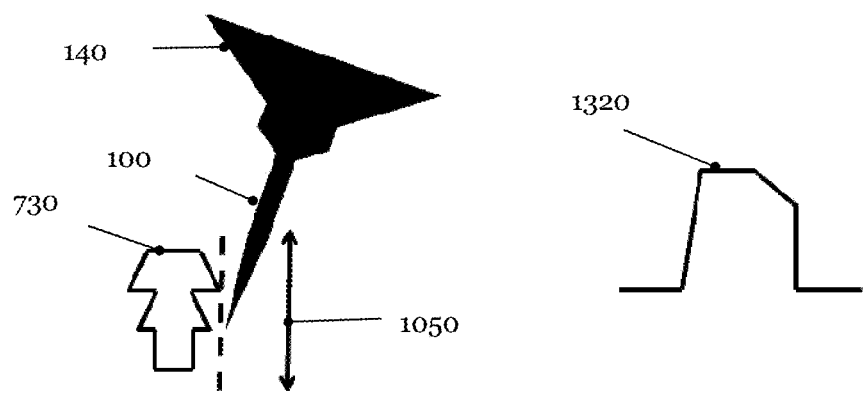
C
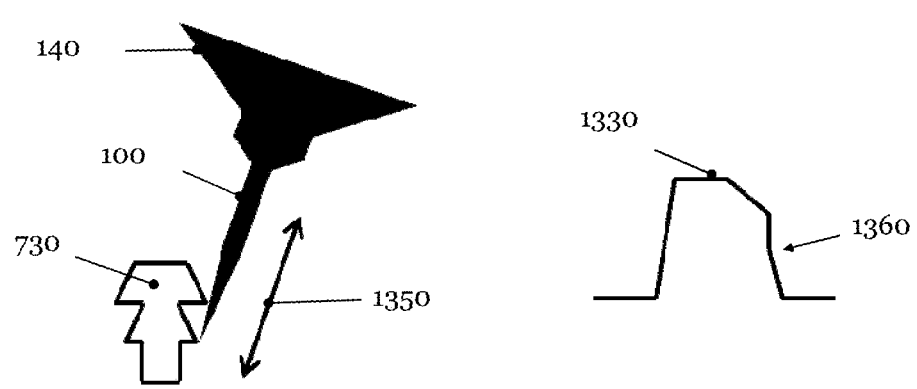

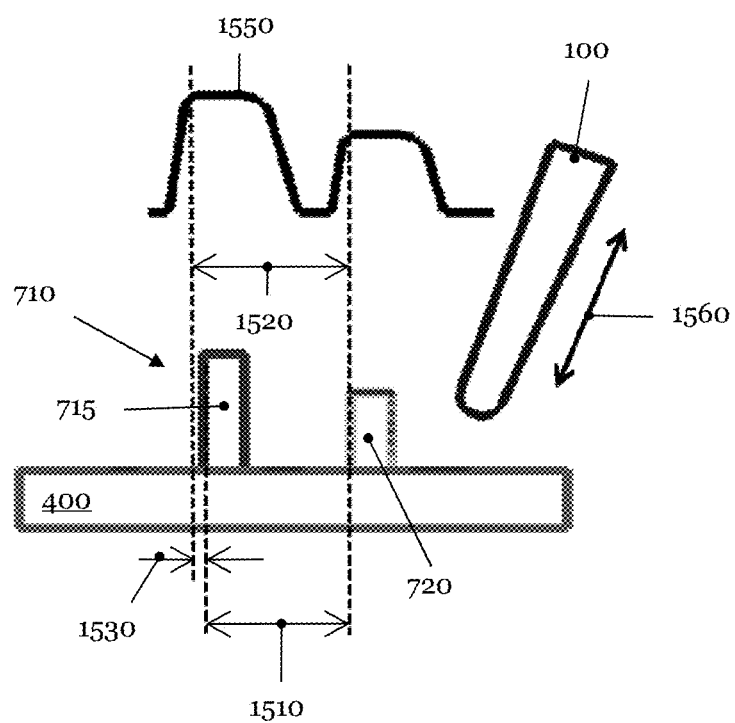

METHOD AND APPARATUS FOR EXAMINING A MEASURING TIP OF A SCANNING PROBE MICROSCOPE

CROSS-REFERENCE TO RELATED APPLICATIONS

This application is a continuation of and claims priority under 35 U.S.C. § 120 to U.S. patent application Ser. No. 16/736,360, filed on Jan. 7, 2020, which is a continuation of and claims priority to PCT Application No. PCT/EP2018/067835, filed on Jul. 2, 2018, which claims priority from German Application No. 10 2017 211 957.8, filed on Jul. 12, 2017. The entire contents of each of these priority applications are incorporated to herein by reference.

TECHNICAL FIELD

The present invention relates to a method and an apparatus for examining a measuring tip of a scanning probe microscope.

BACKGROUND

Scanning probe microscopes use a measuring tip to sense a sample or the surface thereof and thus yield measurement data for producing a representation of the topography of the sample surface. Below, scanning probe microscopes are abbreviated SPM. A distinction is made between various SPM types depending on the type of interaction between the measuring tip and the sample surface. Use is often made of scanning tunneling microscopes (STM), in which a voltage is applied between the sample and the measuring tip, which do not touch one another, and the resulting tunneling current is measured.

In the microscope referred to as atomic force microscope (AFM) or scanning force microscope (SFM), a measuring probe is deflected by atomic forces of the sample surface, typically attractive van der Waals forces and/or repulsive forces of the exchange interaction.

In addition to these conventional SPM types, there are a multiplicity of further appliance types which are used for specific fields of application, such as e.g. magnetic force microscopes or optical and acoustic near-field scanning microscopes.

The disturbance in an image recorded by scanning a probe of an SPM that is caused on account of a non-ideal geometry of a measuring tip is a significant restriction of the nanometric measurement technique of a scanning probe microscope. This particularly applies to samples with a large aspect ratio, in particular if the aspect ratio of the sample surface comes close to the geometry of the measuring tip or even exceeds the latter. In order to check whether this is the case, use is made of test bodies with test structures for analyzing the geometry or the form of a measuring tip of a probe of a scanning probe microscope. The following documents describe the production of a test structure for ascertaining the geometry or the form of a measuring tip of the probe of a scanning probe microscope: U.S. Pat. No. 5,960,255, DE 101 07 796 A1, EP 0 676 614 A1 and U.S. Pat. No. 8,650,661 B2.

The following documents consider how to take account of the influence of the geometry or form of a measuring tip of an SPM on SPM images of a sample surface: V. Bykov et al.: "Test structure for SPM tip shape deconvolution," Appl. Phys. A 66, p. 499-502 (1998); G. Reiss et al.: "Scanning tunneling microscopy on rough surfaces: Deconvolution of constant current images," Appl. Phys. Lett. 57 (9), Aug. 27, 1990, p. 867-869; Y. Martin and H. K. Wickramasinghe: "Method of imaging sidewalls by atomic force microscopy," Appl. Phys. Lett. 64 (19), May 9, 1984, p. 2498-2500; L. Martinez et al.: "Aspect-ratio and lateral-resolution enhancement in force microscopy by attaching nanoclusters generated by an ion cluster source at the end of a silicon tip," Rev. Sci. Instrum. 82, (2011), p. 023710-1-023710-7; X. Qian et al.: "Image simulation and surface reconstruction of undercut features in atomic force microscopy," SPIE Proc. Vol. 6518, (2007), p. 1-12; L. Udpa et al.: "Deconvolution of atomic force microscopy data for cellular and molecular imaging," IEEE, Sig. Proc. Mag. 23, 73 (2006); Ch. Wong et al.: "Tip dilation and AFM capabilities in the characterization of nanoparticles," J. O. Min. 59, 12 (2007); J. S. Villarrubia: "Algorithms for scanned particle microscope image simulation, surface reconstruction, and tip estimation," J. Res. Natl. Inst. Stand. Technol. 102, p. 425-454 (1997); X. Qian and J. S. Villarrubia: "General three-dimensional image simulation and surface reconstruction in scanning probe microscopy using a dexel representation," Ultramicroscopy 1008 (2007), p. 29-42.

Scanning probe microscopes can be used in different operating modes.

In all modes of operation, the measuring tips of scanning probe microscopes are subject to wear as a result of the interaction with the sample. The degree of wear or abrasion depends, inter alia, on the mode of operation of the SPM and the type of interaction between the measuring probe and the sample. The following publications consider the wear of a measuring tip of a probe of an SPM: J. Schneir et al.: "Increasing the value of atomic force microscopy process metrology using high-accuracy scanner, tip characterization, and morphological image analysis," J. Vac. Sci. Technol. B14(2), March/April 1996, p. 1540-1546; G. Dahlen et al.: "Tip characterization and surface reconstruction of complex structures with critical dimension atomic force microscopy," J. Vac. Technol. B 23(6), November/December 2005, p. 2297-2303; G. Dahlen et al.: "Critical dimension AFM tip characterization and image reconstruction applied to the 45 nm node," SPIE Proc. Vol. 6152, p. 61522R-1 to 61522 R-11; J. E. Griffith and D. A. Grigg: "Dimensional metrology with scanning probe microscopes," J. Appl. Phys. 74 (9), 1 Nov. 1993, p. R83-R109.

In addition to wear, measuring tips may also become dirty during their operation. Both wear and dirtying of the measuring tip of a scanning probe microscope have an influence on the quality of the measurement data, and hence on the quality of the image of the surface of a sample generated therefrom.

One option for at least partly escaping the above-described problem consists of a regular replacement of a probe of a scanning probe microscope, without a preceding check of the state of the measuring tip of the probe. This procedure firstly leads to rejection of probes that are still usable, which is connected to significant costs, and secondly results in long downtimes of the scanning probe microscope on account of the frequent changing of the probes.

The present invention therefore addresses the problem of specifying a method and an apparatus that allow an optimization of the use of a measuring tip of a scanning probe microscope.

SUMMARY

According to one exemplary embodiment of the present invention, this problem is solved by a method for examining a measuring tip of a scanning probe microscope. The method includes the following steps: (a) generating at least one test structure before a sample is analyzed, or after said sample has been analyzed, by the measuring tip; and (b) examining the measuring tip with the aid of the at least one generated test structure.

Should the measuring tip of a scanning probe microscope not be replaced in preventative fashion at regular intervals, it is necessary—as described in the preceding section—to determine the geometry or the form of the measuring tip from time to time in order to determine the wear and/or the degree of dirtying of a measuring tip of an SPM. Typically, this requires the sample to be examined to be replaced by a test body. Alternatively, the probe can be disassembled from the SPM in order to analyze the measuring tip of the said probe externally with the aid of a test body that carries a test structure. Both are very time-consuming processes, particularly if the scanning probe microscope is operated in a vacuum environment.

A method according to the invention avoids these time-consuming processes by virtue of a test structure being generated in situ within the scope of an analysis process for a sample where necessary, said analysis process being carried out with the aid of a measuring tip of an SPM and said test structure being used to examine the current geometry or form of the measuring tip. This can reduce the downtime of an SPM, or a throughput of samples to be examined by a scanning probe microscope can be increased.

Further, a test structure on an external test body is subject to wear and/or dirtying. Therefore, the topography of the test structure must be analyzed at periodic intervals and cleaned where necessary. This leads to a further time-consuming cleaning process, which significantly impedes the workflow in many analysis processes of samples carried out by a measuring tip of a scanning probe microscope.

A method according to the invention defines the in situ production of a test structure in the surroundings or vicinity of its use location. During the directly subsequent examination of the measuring tip using the generated test structure, the latter has neither been worn down nor subject to dirtying.

SPMs are frequently used to detect the contour of defects of a sample. Should this detection not yield a realistic image of the contour of a defect or of one or more marks that are used for aligning a repair apparatus in respect of a defect on account of a form of the measuring tip used for scanning purposes that is not exactly known, a correction of the defect may fail and, in the worst case, even exacerbate the defect.

A test structure generated once is available for a regular examination of the measuring tip of the SPM and thereby reduces the risk of an error-afflicted analysis of the contour of a defect and/or of the repair or compensation thereof.

The expression "after a sample has been analyzed by the measuring tip" includes the scanning of the sample being interrupted should signs that the measuring tip of the SPM is not suitable or only has qualified suitability for sensing the sample arise during the simultaneously carried out analysis of the measurement data generated by use of the scanning. Further, the aforementioned passage does not preclude the generation of a test structure and the analysis of a sample by the measuring tip being carried out at the same time.

The at least one test structure can be generated on the sample and/or on a substrate. The substrate can be disposed in a vacuum chamber in which the sample is analyzed and is disposed at a site in the vacuum chamber of the scanning probe microscope that is accessible to the measuring tip. The substrate may comprise a sample stage and/or a sample holder.

The generation of the at least one test structure may comprise a deposition of at least one test structure and/or an etching of the at least one test structure.

The most important part of a test structure is the contour thereof. Whether this contour is generated by depositing material on a substrate, by etching the test structure into a substrate and/or by depositing material on a substrate and subsequently etching the test structure into the deposited material is unimportant for the functioning thereof.

A contour of the at least one test structure may be matched to a contour of the sample.

An advantage of generating a test structure in situ is that the contour thereof can be matched to the contour of a sample to be examined. Firstly, this can ensure that use is made of a measuring tip with a sufficient quality, i.e., with an appropriate radius of curvature of the tip of the measuring tip and with a matched aperture angle of the measuring tip for analyzing the sample, and, secondly, this can ensure that the outlay for generating the test structure and for examining the measuring tip by use of the generated test structure remains within reasonable levels.

The contour of the at least one test structure may be matched to the form of the measuring tip.

By way of example, the contour of the test structure can have substantially the same form as the original or prescribed form of the measuring tip itself. This configuration eases the examination of the measuring tip or of the current form of the measuring tip of an SPM and/or the determination of correction values for correcting the measurement data recorded by the measuring tip for the purposes of generating a realistic contour of the analyzed sample. A combination, in which the test structure may be matched both to the form of the measuring tip and to a contour of the sample, is also conceivable.

Here and elsewhere in this application, the expression "substantially" denotes an indication of a measurement variable within its error tolerances when the measurement variable is measured using measuring instruments in accordance with the prior art.

The contour of the at least one test structure can be embodied to detect a movement direction of the measuring tip that deviates from a sample normal.

As a result, it is possible to identify and correct artifacts when determining a position of a defect or of a mark. The measurement accuracy of the measuring tip of the SPM can be improved by virtue of the test structure allowing the determination of whether the movement direction of the measuring tip has a deviation from the z-direction, i.e., from the sample normal. The effect of a non-perpendicular movement of the measuring tip can be taken into account when generating an image of the measurement data generated by use of the scanning.

A movement of the measuring tip relative to a sample surface occurs in a mode of operation in which a cantilever, to which the measuring tip has been fastened, is made to vibrate, preferably at or in the vicinity of a resonant frequency of the cantilever. Further, a periodic relative movement between sample and measuring tip occurs during to a step-in mode of operation.

The contour of the at least one test structure can be embodied to detect a height-dependent lateral offset of a measuring tip, which comprises a movement direction of the measuring tip that deviates from the sample normal.

The determination of this quantity is of particular importance when the measuring tip is used to analyze the contour of a defect and the defect is repaired or compensated by use of a repair apparatus, wherein the image of the defect or a mark by the scanning probe microscope is aligned with an image of the defect or the mark recorded by the repair apparatus.

The contour of the at least one test structure can be embodied to detect a measuring tip that is oriented at an angle that differs from zero with respect to the sample normal, while the measuring tip carries out a periodic movement parallel to the surface normal.

The contour of the at least one test structure can be embodied to distinguish between a movement direction of the measuring tip that deviates from the sample normal and a movement of the measuring tip in the normal direction, wherein the measuring tip has an angle that differs from zero with respect to the sample normal.

This property of the test structure allows a distinction to be made as to whether a lateral component, for instance in the x-direction or the fast scanning direction, has been added to the closed-loop control for the z-direction when scanning the measuring tip over the test structure or whether an obliquely positioned measuring tip carries out a vibration along the sample normal. In the mode of operation specified first, better imaging of samples with protruding structure elements is typically achieved under the precondition that the oblique movement has a movement component in the direction of the protrusion.

The contour of the at least one test structure can be embodied to maximize a component of the measuring tip imaged by the at least one test structure.

Such a test structure facilitates precise imaging of not only the tip of the measuring tip, but also of a portion of the entire surface of the measuring tip that is as large as possible. If the geometry or the form of the entire measuring tip is known, the influence of the measuring tip on the measurement data of a scanning procedure can be determined to the best possible extent and can be compensated when generating an image of a scanned sample surface.

The test structure can be rotationally symmetric with respect to the sample normal. A cross section of the test structure can be elliptical or polygonal. The test structure may comprise at least one column-like structure with a conical tip, which ends in a hemispherical form.

The at least one test structure may comprise at least one tip with a radius of curvature of <100 nm, preferably <50 nm, more preferably <20 nm and/or most preferably <10 nm and/or the at least one test structure may comprise an aperture angle of <40°, preferably <30°, more preferably <20° and most preferably <10°.

The test structure may comprise at least one structure element with an undercut.

This property of the test structure allows the form of a measuring tip to be analyzed away from the tip thereof without the tip of the measuring tip interacting with the test structure. This ensures a precise examination of the measuring tip. Moreover, a suitably undercut test structure can be used to examine the measuring tip of a CD AFM (critical dimension atomic force microscope).

The at least one test structure can be generated at a site of the sample or of the substrate at which the at least one test structure substantially does not impair a function of the sample or of the substrate.

Generating the at least one test structure may comprise: providing a focused particle beam and at least one precursor gas at the site at which the at least one test structure is generated. The precursor gas for depositing a test structure may comprise a metal carbonyl and/or a metal alkoxide. The metal carbonyl may comprise chromium hexacarbonyl ($Cr(CO)_6$) and/or molybdenum hexacarbonyl ($Mo(CO)_6$), tungsten hexacarbonyl ($W(CO)_6$), dicobalt octacarbonyl ($Co_2(CO)_8$), triruthenium dodecacarbonyl ($Ru_3(CO)_{12}$) and iron pentacarbonyl ($Fe(CO)_5$). The metal alkoxide may comprise tetraethyl orthosilicate (TEOS) ($Si(OC_2H_5)_4$) and/or titanium isopropoxide ($Ti(OCH(CH_3)_2)_4$). Further precursor gases for depositing one or more test structures are specified in the applicant's US patent application having the Ser. No. 13/0,103,281.

Further, the at least one test structure may comprise carbon as a main constituent part. Such a test structure, which is deposited on a photolithographic mask, for example, is advantageous in that the test structure can be removed substantially without residue from the mask again at the end of the mask production process or the mask repair process using standard cleaning methods. Precursor gases for depositing test structures predominantly containing carbon are: ethene ($H_2C_2$), pyrene ($C_{16}H_{10}$), hexadecane ($C_{16}H_{34}$), formic acid ($CH_2O_2$), acetic acid ($C_2H_4O_2$), acrylic acid ($C_3H_4O_2$), propionic acid ($C_3H_6O_2$), methyl methacrylate (MMA) ($C_5H_8O_2$) and paraffins.

The particle beam may comprise an electron beam, an ion beam, a photon beam, an atomic beam and/or a molecular beam. The at least one test structure can be deposited with the aid of an electron beam-induced deposition (EBID) process. An electron beam-induced deposition process is advantageous in that the employed electron beam causes no damage, or no substantial damage, to the sample to be examined.

Depositing and/or etching the at least one test structure may comprise: providing a focused particle beam and at least one etching gas at the site of the at least one test structure. The etching gas may comprise: Xenon difluoride ($XeF_2$), xenon dichloride ($XeCl_2$), xenon tetrachloride ($XeCl_4$), water vapor ($H_2O$), heavy water ($D_2O$), oxygen ($O_2$), XNO, $XONO_2$, $X_2O$, $XO_2$, $X_2O_2$, $X_2O_4$, $X_2O_6$, where X is a halide, ammonia ($NH_3$) and/or nitrosyl chloride (NOCl). Further etching gases for etching one or more of the deposited test structures are specified in the applicant's US patent application having the Ser. No. 13/0,103,281.

Firstly, a local etching process allows deposited test structures to be matched to a sample to be examined and/or to a measuring tip when necessary. This allows test structures to be generated, the structure quantities of which have dimensions that cannot be achieved with the aid of a deposition process. Secondly, a local etching process allows test structures to be generated directly, for example by etching into a substrate of a mask.

The at least one test structure can be generated on the sample when the sample is produced.

In another embodiment, the test structure is already produced on the sample during the production process of the latter. As a result, the test structure can be matched individually to the structure elements of a sample. Then, this individualized test structure is available during the service life of the sample in order to optimize the analysis of the sample with the aid of a measuring tip of an SPM by examining the measuring tip employed for the analysis. However, the problems regarding wear and dirtying, as explained above, must be taken into account, particularly when the sample is operated outside of a vacuum environment.

Steps a. and b. can be carried out in vacuo without breaking the vacuum.

A scanning probe microscope is often applied in combination with a scanning particle microscope, for instance a scanning electron microscope. Typically, a scanning particle microscope operates in a vacuum environment. The above-defined method is advantageous in that the scanning particle microscope may provide a focused particle beam for depositing and/or etching the test structure, and so the sample does not have to be replaced and the measuring tip does not have to be interchanged for the purposes of depositing the test structure and examining the measuring tip of the SPM. Since the SPM scans the sample in a vacuum environment, the deposited test structure is subjected to substantially no dirtying.

Examining the measuring tip may comprise: scanning the measuring tip over the at least one deposited test structure.

When scanning a measuring tip of an SPM over a sample or test structure, the measurement data of the SPM contain a superposition of the geometry or the form of the measuring tip and the contour of the sample or the contour of the test structure. Mathematically, the superposition is described by a convolution or convolution operator. The next paragraph specifies citations that describe a convolution of a sample and the measuring tip of an SPM. If a radius of curvature of the measuring tip and the aperture angle thereof are small in relation to the contour of the sample, the measurement data of a scanning procedure over the sample substantially image the contour of the sample. In the other limit case, when the contour of the sample has changes in the height profile that are greater or very much greater than the form or geometry of the measuring tip, the changes in the height profile of the sample substantially image the form of the measuring tip.

In order to prevent the case mentioned last, a test structure adopts the function of a reference normal, with the aid of which the measuring tip of an SPM can be examined in order to determine the geometry or form thereof. This means that the contour of the test structure should have at least a similar size as the form of a measuring tip. However, it is better if the contour of the test structure has steeper changes than the form of the measuring tip of the SPM. On the basis of knowledge of the form of the measuring tip, the actual contour of a sample can be deduced from the measurement data from scanning said sample. This process or this deconvolution process has already been described multiple times in the literature, for example in the documents cited in the introductory part: X. Qian et al.: "Image simulation and surface reconstruction of undercut features in atomic force microscopy," SPIE Proc. Vol. 6518, (2007), p. 1-12; L. Udpa et al.: "Deconvolution of atomic force microscopy data for cellular and molecular imaging," IEEE, Sig. Proc. Mag. 23, 73 (2006); J. S. Villarrubia: "Algorithms for scanned particle microscope image simulation, surface reconstruction, and tip estimation," J. Res. Natl. Inst. Stand. Technol. 102, p. 425-454 (1997); G. Dahlen et al.: "Tip characterization and surface reconstruction of complex structures with critical dimension atomic force microscopy," J. Vac. Sci. Technol. B 23(6), November/December 2005, p. 2297-2303; and X. Qian and J. S. Villarrubia: "General three-dimensional image simulation and surface reconstruction in scanning probe microscopy using a dexel representation," Ultramicroscopy 1008 (2007), p. 29-42.

The deconvolution operation mathematically represents the reversal of the convolution operation. The deconvolution of the measurement data, which were generated by scanning the measuring tip of an SPM about a meaning of the influence of the measuring tip, becomes more important if the greatest changes in the height profile of the sample come into the vicinity of the form of the measuring tip or even exceed the latter.

Moreover, it is very important for a reproducible quantitative measurement of an SPM to know the changes in form of a measuring tip on account of wear and/or dirtying and to take this into account in the analysis of the measurement data generated by the measurement tip for the purposes of generating a contour of a sample surface.

Examining the measuring tip may comprise: Imaging the at least one deposited test structure by way of a focused particle beam.

Preferably, the test structure on the sample and/or the substrate is generated by use of a particle beam-induced deposition process and/or by use of a particle beam-induced etching process. As a result, a focused particle beam is typically available in an apparatus for carrying out a method according to the invention. Said focused particle beam can be used to analyze whether the contour of the deposited test structure corresponds to a predetermined contour. If there are deviations therefrom, the deposited test structure can be modified with the aid of a local etching process in such a way that the measured contour of said deposited test structure substantially corresponds to the predetermined contour.

Examining the measuring tip may further comprise: generating a map of regions of the sample that cannot be reached by the measuring tip of the scanning probe microscope.

This map allows the region or regions of a sample in which the image data generated from the measurement data do not correctly reproduce the actual contour of the sample to be ascertained. The regions in which the contour of the sample cannot be determined can be reduced or can be made to virtually disappear by way of replacing the measuring tip with a finer measuring tip, i.e., with a smaller radius of curvature and/or with a smaller aperture angle, and/or by scanning the measuring tip, wherein the movement of the measuring tip has a movement component perpendicular to the sample normal and hence a lateral movement component.

The method according to the invention may further include the step of: scanning to the sample by a particle beam for finding a defect in the sample. A photon beam and/or an electron beam is preferably used for analyzing a sample surface.

Further, the method according to the invention can include the step of: generating at least one mark on the sample for the purposes of finding the defect by the measuring tip of the scanning probe microscope. The at least one mark may comprise the at least one test structure.

Frequently, a mark is applied to a sample having one or more defects, which are analyzed by different types of metrology appliances. The mark(s) serve for easier identification of the regions to be analyzed by the respective metrology appliance. Further, these mark(s) can be used for correcting the drift of the repair apparatus during a repair process. By virtue of these mark(s) being embodied in such a way that these additionally satisfy the function of a test structure for a measuring tip of a scanning probe microscope, a test structure can be created with minimal additional outlay in the direct vicinity of a region of a sample to be analyzed. Moreover, this minimizes the outlay for switching between an analysis of the sample with the measuring tip and examining the measuring tip of the SPM by use of the test structure.

Examining the measuring tip may comprise: determining a current form of the measuring tip on the basis of scanning the measuring tip over the at least one deposited test structure. Further, examining the measuring tip may comprise: comparing the current form of the measuring tip to a predetermined form of the measuring tip and/or comparing the current form of the measuring tip to the contour of the sample.

The method according to the invention may further include the step of: scanning the sample with the measuring tip if the current form of the measuring tip lies within a predetermined variation range in respect of the predetermined form of the measuring tip and/or if the current form of the measuring tip has a predetermined distance from the maximum change in the height profile of the sample.

In addition, the method according to the invention can include the step of: changing the measuring tip of the scanning probe microscope if the current form lies outside the predetermined variation range in respect of the predetermined form. Changing the measuring tip may comprise: changing the measuring tip of the scanning probe microscope or using another measuring tip of a probe arrangement of the scanning probe microscope.

Using a probe arrangement with two or more probes can firstly increase the utilization of the individual measuring tips on the basis of the sample(s) to be analyzed by virtue of already worn measuring tips being used for analyzing samples that have no great aspect ratio in their contour. Secondly, the time interval between replacements of a probe arrangement can be significantly lengthened in comparison with a probe containing only a single measuring tip. The aspect ratio denotes the ratio of the depth or height of a structure to its (smallest) lateral dimension.

Moreover, the method according to the invention can include the step of: cleaning and/or sharpening the measuring tip of the scanning probe microscope if the current form lies outside the predetermined variation range of the predetermined form. Cleaning and/or sharpening the measuring tip of the scanning probe microscope may comprise: Irradiating the measuring tip with a focused particle beam. Moreover, cleaning and/or sharpening the measuring tip can comprise: providing an etching gas at the site of the measuring tip.

An advantage of the described method is that the processes of sharpening and cleaning a measuring tip can be carried out in an SPM without the measuring tip having to be disassembled from the scanning probe microscope to this end.

The step of sharpening and/or the step of cleaning can be repeated once to ten times, preferably once to eight times, more preferably once to five times, and most preferably once to three times.

Moreover, the method according to the invention can include the step of: depositing material on the tip of the measuring tip if the current form of the measuring tip lies outside of the predetermined variation range of the form of the measuring tip.

Depositing material on the tip of a worn measuring tip can restore the original radius of curvature thereof and can hence significantly increase the service life of said measuring tip.

By way of example, a carbon-based, long, fine measuring tip, which is known as a "whisker tip," can be deposited on the measuring tip.

Finally, the method according to the invention can comprise the steps of: (a) removing a measuring tip if the current form of the measuring tip lies outside of the predetermined variation range of the form of the measuring tip and (b) depositing a new measuring tip. Step (a) can be carried out with the aid of an electron beam-induced and/or ion beam-induced etching process.

The measures explained last can be carried out since the success thereof can easily be checked on the basis of the continuously available test structure, and so the influence of the repaired measuring tip, i.e., the sharpened or cleaned or newly produced measuring tip, on the measurement data generated by the measuring tip is known at all times and can be removed by calculation. As a result, the discussed measures facilitate a drastic lengthening of the time between two changes of a measuring tip in comparison with a scanning probe microscope whose measuring tip cannot be repaired.

The sample may comprise a photolithographic mask or a wafer. The at least one test structure can be deposited on an edge of the photolithographic mask, on which edge substantially no radiation at an actinic wavelength is incident. Further, the at least one test structure can be deposited on an edge of a wafer between two chips.

The at least one test structure can be deposited on a pattern element of the photolithographic mask. In particular, the at least one test structure can be deposited on an absorbing pattern element of the photolithographic mask.

This embodiment is advantageous in that the distance between the test structure and the region to be analyzed by the measuring tip of the SPM can be kept small, simplifying an examination of the measuring tip at short time intervals within an analysis process of the sample by the measuring tip of the SPM.

In accordance with a further exemplary embodiment of the present invention, the problem mentioned above is solved by an apparatus for examining a measuring tip of a scanning probe microscope. The apparatus comprises: (a) a generation unit that is embodied for generating a test structure before a sample is analyzed, or after said sample has been analyzed, by the measuring tip; and (b) an examination unit that is embodied to examine the measuring tip with the aid of the at least one generated test structure.

The generation unit can be embodied to deposit a test structure and/or etch a test structure.

The generation unit can be embodied to generate the at least one test structure on the sample and/or on a substrate.

The apparatus according to the invention may further comprise a displacement unit that is embodied to bridge a distance between a point of incidence of a particle beam of the generation unit on the sample and/or a substrate and an interaction location between the sample and/or the substrate and the measuring tip.

Moreover, the apparatus according to the invention can be embodied to carry out the method steps of the above-defined method according to the invention and of the aspects specified above.

Finally, a computer system may comprise instructions that, when executed by a computer system of an apparatus, prompt a control device of the apparatus to carry out the steps of the above-defined method and of the aspects specified above

DESCRIPTION OF DRAWINGS

The following detailed description describes currently preferred exemplary embodiments of the invention, with reference being made to the drawings, in which:

FIG. 1 shows a schematic representation of a probe of a scanning probe microscope (SPM) in partial image A and reproduces a probe arrangement of a scanning probe microscope comprising two different measuring tips in partial image B;

FIG. 8 shows a section through two exemplary etched test structures;

FIG. 10 represents the sensing of a section of a photolithographic mask with an ideal measuring tip, oriented perpendicular to the masked normal, in partial image A and specifies changes caused by real measuring tips in partial image B;

FIG. 13 elucidates sections of a sensing procedure over an embodiment of a test structure which are carried out with different movement forms of a measuring tip, wherein the test structure has two structure elements with two indents or undercuts;

FIG. 15 represents a section of a scanning procedure of a measuring tip of a scanning probe microscope over a test structure specified in FIG. 7, wherein the measuring tip carries out a movement deviating from the sample normal.

DETAILED DESCRIPTION

Figure 2:
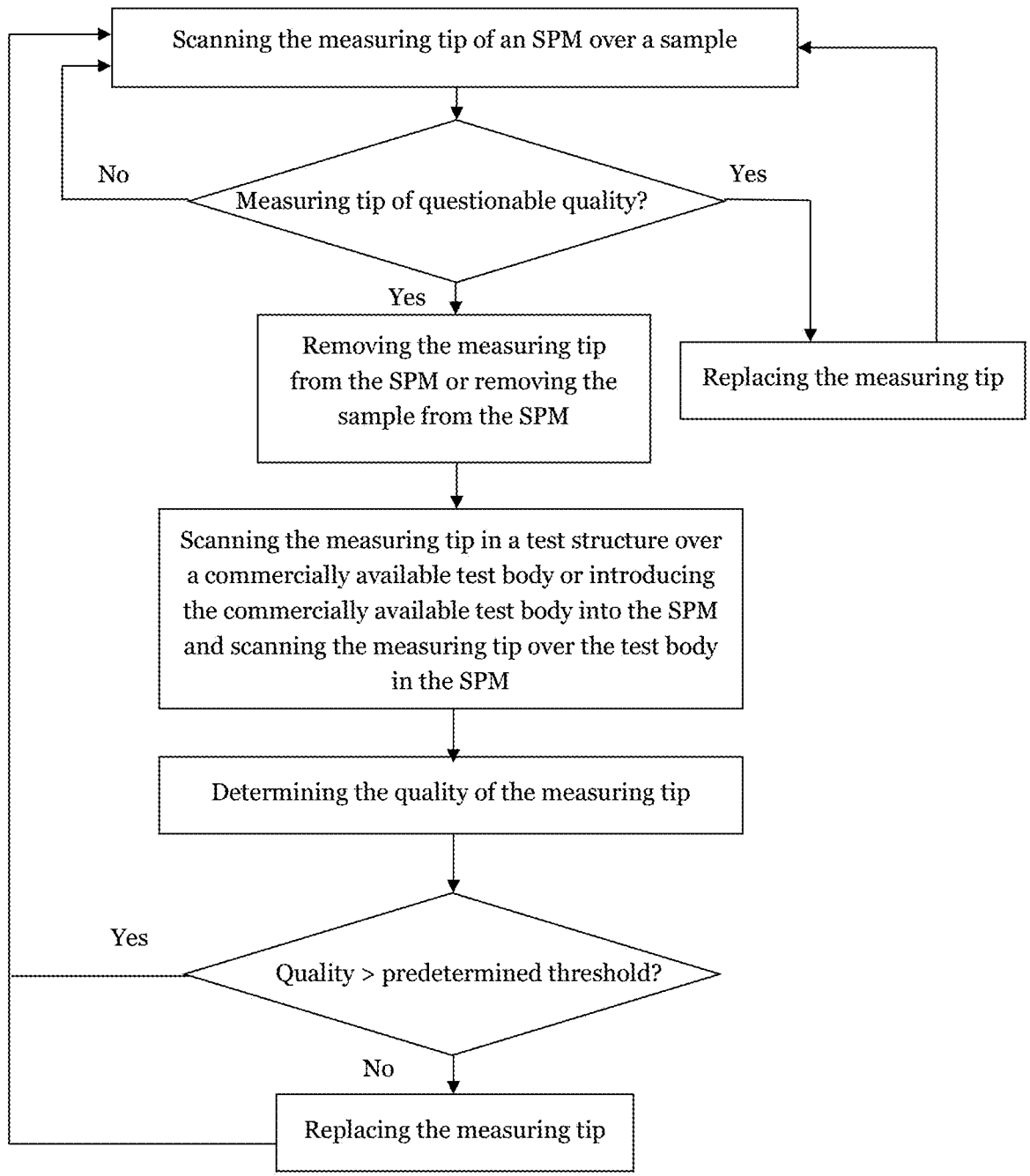
FIG. 2 schematically elucidates the course of a test of a measuring tip of an SPM and of a probe change according to the prior art.

Below, currently preferred embodiments of a method according to the invention for examining a measuring tip of a scanning probe microscope (SPM) are explained in more detail using the example of an atomic force microscope (AFM). However, the method according to the invention is not restricted to the application by an atomic force microscope. Rather, the method according to the invention can be used for all types of scanning probe microscopes, the measuring tips of which are subject to wear as a result of interaction with a sample. Further, the defined method can be used for examining a measuring tip that is dirtied as a result of scanning the measuring tip over a sample surface.

Below, the method according to the invention is explained using the example of an analysis of a photolithographic mask with a measuring tip of an AFM. However, the application of the method according to the invention is not restricted to scanning over a photolithographic mask. By contrast, the method specified in this application can be used to optimize the examination of all types of samples with the aid of a scanning probe microscope. Mentioned here purely by example is the analysis of a wafer during various production steps of an integrated circuit or semiconductor component. Finally, what should still be mentioned at this juncture in exemplary fashion is that the measuring tip of an SPM can also be used for the purposes of processing a sample in addition to the analysis. There is an intensive interaction between the measuring tip and a sample surface when processing a sample with the aid of a measuring tip of an SPM. Therefore, the measuring tip of an SPM is subject to increased wear and/or more pronounced dirtying during the processing of a sample. This means that the method according to the invention can be used particularly advantageously for optimizing the processing process when processing a sample by a measuring tip of an SPM.

Upper partial image A in FIG. 1 shows a probe 150 of the scanning probe microscope schematically and with great magnification. The probe 150 comprises a cantilever 140, which ends in a holding plate 160 at one end. With the aid of the holding plate 160, the probe 150 is incorporated into a measuring head of an SPM. By way of example, the holding plate 160 of the probe 150 can be used for fastening the probe 150 to a piezo-actuator of an SPM (not illustrated in FIG. 1). The end of the cantilever 140 opposing the holding plate 160, or the free end of said cantilever, carries a measuring tip 100 that ends in a tip 120. The measuring tip 100 can have any form. By way of example, the measuring tip 100 can have a pyramidal form or the form of a paraboloid of revolution. Further, the measuring tip 100 may have a flared-tip form (not illustrated in FIG. 1).

The cantilever 140 and the measuring tip 100 may be configured in one piece. By way of example, the cantilever 140 and the measuring tip 100 may be manufactured from a metal, for instance tungsten, cobalt or iridium, from a metal alloy, from a semiconductor, for instance silicon, or from an insulator, for instance silicon nitride. It is also possible to manufacture the cantilever 140 in the measuring tip 100 as two separate components and to subsequently connect these to one another. This can be effectuated by adhesive bonding, for example.

In place of the probe 160 with a single measuring tip 100 and a single cantilever 140, as illustrated in partial image A, the SPM can use a measuring tip carrier or a probe arrangement 190, which has two or more measuring tips 100 and 110. A probe arrangement 190 is presented schematically and with great magnification in the lower partial image B of FIG. 1, said probe arrangement comprising five measuring tips 100 and 110, which have different lengths and a different form. The measuring tip 100, which may be identical to the measuring tip 100 of the probe 150, is attached to two cantilevers 140 of the probe arrangement 190 and three cantilevers 140 of the measuring tip carrier 190 comprise the measuring tip 110. Both measuring tips 100 and 110 are designed for analysis purposes in the probe arrangement 190 of FIG. 1. It is also possible for each of the five cantilevers 140 of the probe arrangement 190 to carry a measuring tip whose form is different and consequently designed for a specific analysis of a sample (not reproduced in FIG. 1).

Further, it is possible for the measuring tip carrier 190 to simultaneously carry a number of measuring tips that are optimized for analysis and processing purposes (not shown in FIG. 1).

The entire probe 150 is always replaced when a measuring tip 100 of the probe 150 is changed. The probe arrangement 190 is replaced or there is a change from a worn and/or dirtied measuring tip 100, 110 to a less worn or not worn and non-dirtied measuring tip 110, 100 when changing the measuring tip 100, 110 of the probe arrangement 190.

When reference is made to a measuring tip 100, 110 below, no distinction is made as to whether this measuring tip 100 is attached to a probe 150 or a probe arrangement 190. Moreover, no distinction is made in respect of the specific form or geometry of this measuring tip 100, 110 and the task for which the latter is designed.

FIG. 2 presents the course of a method for examining a measuring tip 100, 110 of an SPM according to the prior art in exemplary fashion. If indications for the quality of the measuring tip 100, 110 not meeting a predetermined level of quality are detected while the measuring tip 100, 110 is scanned over a sample, then there are two ways to handle this notification. Firstly, the measuring tip 100, 110 can be replaced without further analysis and the scanning procedure of the sample is thereupon continued with the new measuring tip. This may be particularly expedient if the scanning probe microscope uses a probe arrangement 190 that comprises a plurality of measuring tips 100, 110.

In an alternative procedure, the measuring tip 100, 110 is removed from the SPM and analyzed in a specific test construction on the basis of the commercially available test body, which contains a test structure. Alternatively, the sample in an SPM can be replaced by the test body and the measuring tip 100, 110 with questionable quality is measured by sensing the test structure of the test body. In the two alternatives specified last, the quality of the measuring tip 100, 110 is subsequently determined and compared to a predetermined quality threshold. A measuring tip 100, 110 passing this test is used further. Should the analyzed measuring tip 100, 110 not meet the demanded quality level, this measuring tip 100, 110 is replaced by a new measuring probe and the scanning procedure of the sample is continued or restarted with a new measuring tip.

Figure 3:
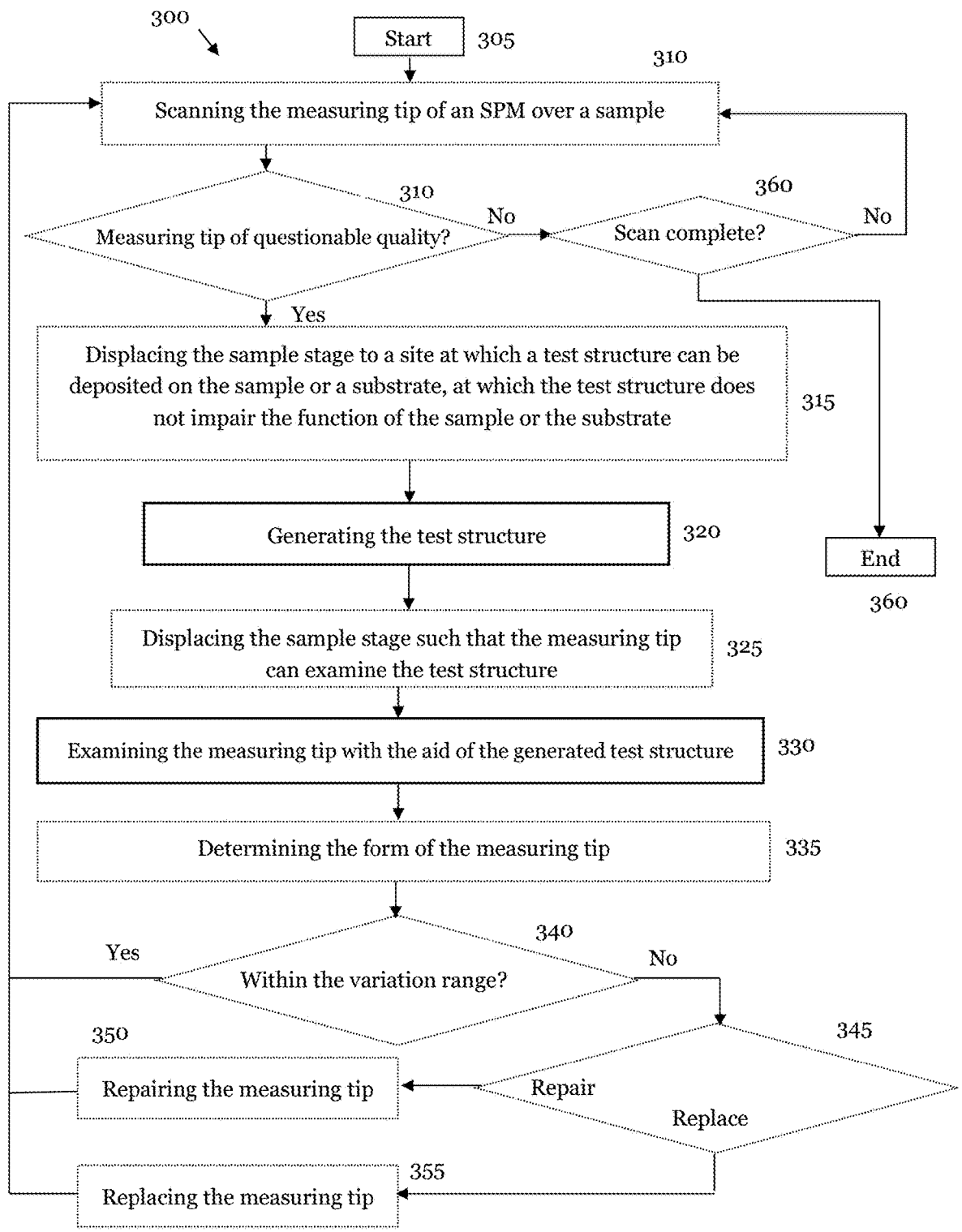
FIG. 3 schematically represents a flowchart of a method according to the invention, with the necessary method steps being highlighted.
Figure 4:
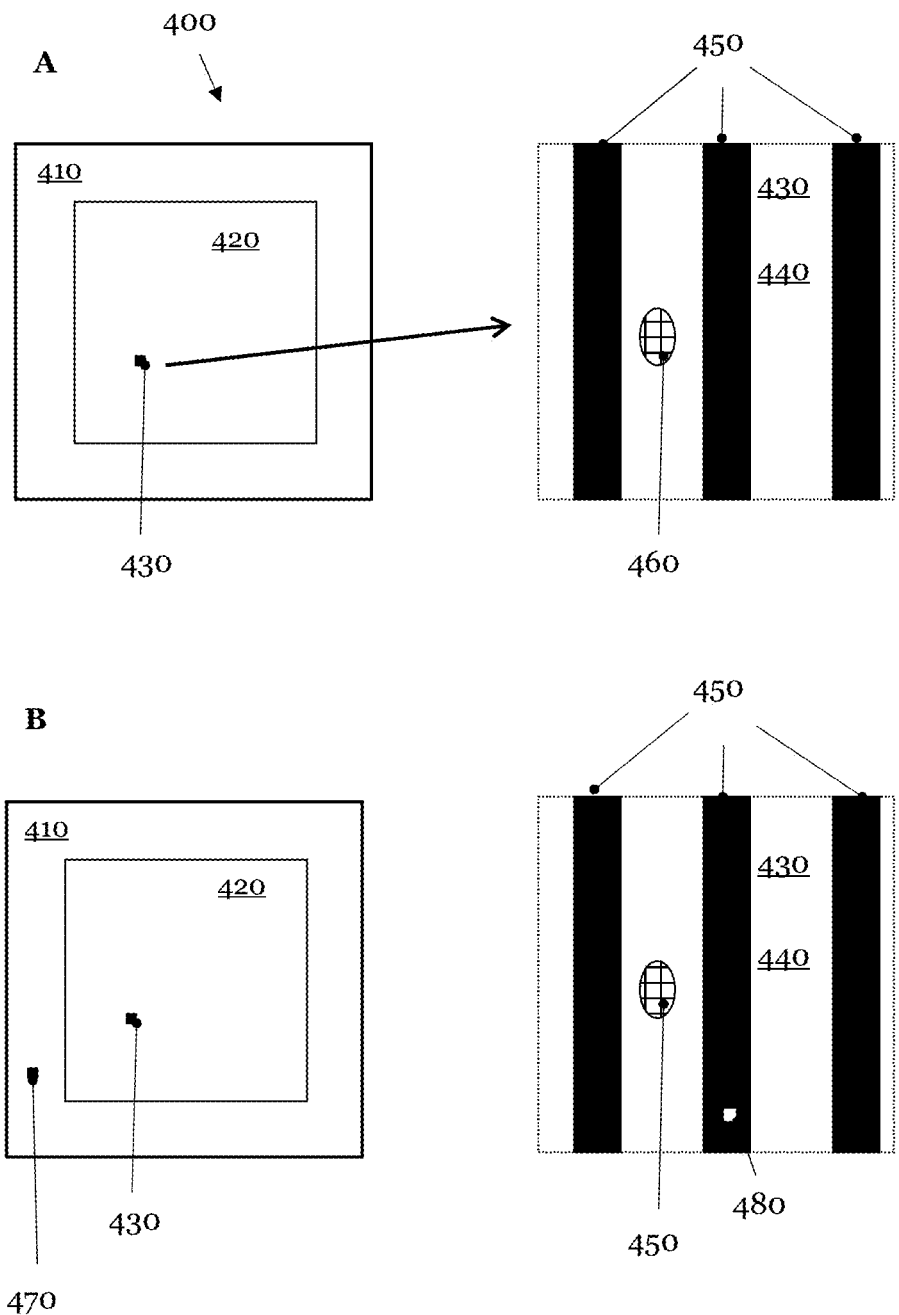
FIG. 4 reproduces a plan view of a photolithographic mask in partial image A on the left, with a section that should be sensed by a measuring tip of an SPM and that is illustrated in magnified fashion on the right, and presents in partial image B partial image A after attachment of a test structure to the edge of the photolithographic mask (left) or on a pattern element (right)

FIG. 3 reproduces a flowchart 300 of a method according to the invention. Method steps that are not mandatory are represented by a dotted frame. These specify how the method according to the invention is embedded in an analysis process and serve to delimit the method specified in this application from the prior art explained in FIG. 2. The process steps essential to carrying out a method according to the invention are highlighted by a solid, emboldened frame. In FIG. 4, some of the method steps are elucidated schematically in parallel using the example of a sample in the form of a photolithographic mask 400.

The method begins with step 305. In a first step 310, a sample is sensed or scanned by the measuring tip 100, 110 of an SPM. A plan view of a photolithographic mask 400 is shown schematically on the left in partial image A of FIG. 4. The photolithographic mask 400, the photomask 400 or simply the mask 400 has an edge 410 and an active surface 420. Unlike the active region 420, the edge 410 comprises no pattern elements and therefore does not serve to image structures into a photoresist, which is disposed on a wafer. The mask 400 can be a transmitting or a reflecting photomask 400. With the measuring tip 100, 110, a scanning probe microscope senses a small section 430 of the photomask 400. The section 430 is illustrated in magnified fashion on the right in partial image A. The section 430 of the photomask 400 comprises a substrate 440, on which three pattern elements 450 in the form of absorbing pattern elements have been deposited. Further, the section 430 of the photomask 400 comprises a defect 460, which is disposed on the substrate 440 of the mask 400. The defect 460 may comprise a depression in the substrate 440, an elevation in the substrate 440 and/or the defect 460 may comprise absorbing material that is deposited at a site on the substrate 440 of the mask 400 that should be free from absorbing material. The defect 460 is typically the reason why the section 430 of the mask 400 is sensed by the measuring tip 100, 110 of an SPM.

The measurement data generated by use of the sensing procedure the measuring tip 100, 110 are evaluated parallel to the scanning procedure of the measuring tip 100, 110 over the section 430 of the mask 400. Here, an analysis carried out as to whether a contour of the sample, i.e., the aspect ratio of the pattern elements 450 and/or a height or depth profile of the defect 460 of the section 430 of the mask 400, can be examined with a predetermined form or geometry of the measuring tip 100, 110. By way of example, this applies if the measuring tip 100, 110 is designed to sense the aspect ratio of the absorbing pattern elements 450 and/or the height or depth profile of the defect 460 in realistic fashion. If this does not apply, it is questionable whether the quality of the measuring tip 100, 110 is sufficient to sense the contour of the sample, i.e., the pattern elements 450 and/or the height or depth profile of the defect 460, in such a way that the measuring tip 100, 110 of the SPM can reach all regions, or nearly all regions, of the substrate 440, of the pattern elements 450 and of the defect 460. If the analyzed measurement data give rise to the fear that this condition is not satisfied, indications are present that the quality of the measuring tip 100, 110 is insufficient for the analysis of the sample or the mask 400. A decision is made in the decision block 310 as to whether these indications are present, i.e., whether the quality of the measuring tip 100, 110 is questionable.

If this does not apply and the measuring tip 100, 110 is suitable for sensing the section 430 of the photolithographic mask 400, a check is carried out in decision block 360 as to whether the scan of the measuring tip 100, 110 over the sample has been completed. If this is the case, the method ends at step 365. However, if scanning of the sample not yet having been completed is determined in the decision block, the method returns to step 310 and continues the scanning or sensing of the sample or of the mask 400 using the measuring tip 100, 110.

By contrast, if the quality of the employed measuring tip 100, 110 being doubtful is determined in decision block 310, the method advances to step 315. In this step, a sample stage is displaced to a site at which a test structure can be deposited on the sample, for example the mask 400 or a substrate. In the exemplary embodiment illustrated in FIG. 4, this displacement can be implemented by displacement elements of a sample stage, which are able to displace a sample stage in the plane of the sample, i.e., in the xy-plane. The x-movement of the sample stage in the x-direction and/or the y-direction can be monitored by an interferometer for each movement direction (cf. the description of FIG. 5).

A test structure is generated in the next step 320. Partial image B of FIG. 4 specifies two exemplary embodiments for sites 470 and 480 on the mask 400, at which a test structure can be generated. A test structure can be generated by depositing a test structure on a sample and/or by etching a test structure into a sample. Details of a generation process of a test structure will be explained in the context of the discussion of FIGS. 5 and 6. Examples of test structures are specified in FIGS. 6, 7 and 8. The left-hand diagram in partial image B shows an example of a test structure that is deposited on the edge 410 or the non-active region 410 of the photolithographic mask 400. The left-hand diagram in partial image B presents the section 430 of the mask 400 that is already illustrated in partial image A lying thereabove. A test structure is deposited at the site 480 on the central pattern element of the pattern elements 450 of the section 430 in partial image B.

In another exemplary embodiment, a test structure can be generated on a substrate of an SPM (not shown in FIG. 4). As a substrate of an SPM, all components of an SPM come into question that can be displaced in such a way that a test structure placed on the substrate can be placed under the measuring tip 100, 110 of the scanning probe microscope. Thus, in particular, the sample stage and/or the sample holder of the SPM is qualified for being a substrate.

Again with reference to FIG. 3, the sample stage or the substrate is displaced in the next step 325 in such a way that the measuring tip 100, 110 of the SPM can sense the test structure generated at the sites 470, 480. To this end, the two aforementioned displacement elements of the sample stage can be used in the exemplary embodiment illustrated in FIG. 4.

Thereupon, the measuring tip 100, 110 is examined in step 330 with the aid of the test structure generated at the site 470, 480. Details of this analysis process are discussed in the context of subsequent FIG. 6.

In process step 335, the present or current form of the measuring tip 100, 110 is determined on the basis of the measurement data, which were obtained when examining the measuring tip 100, 110 on the basis of the test structure generated at the position 470, 480. This process step is explained in greater detail below with reference to FIG. 6.

Whether the present or current form of the measuring tip 100, 110 lies within a predetermined variation range of a new or unused measuring tip is determined in decision block 340. Should this be the case, the method returns to step 310 and continues with the sensing of the sample, for example the mask 400, with the measuring tip 100, 110 of the scanning probe microscope.

By contrast, if the current form of the measuring tip 100, 110 falls outside of the admissible variation range, the method continues with decision block 345. A decision as to whether the measuring tip 100, 110 should be repaired or replaced is made in decision block 345. If the decision is in favor of repair, the measuring tip 100, 110 is repaired in step 350. A measuring tip 100, 110 can be repaired in four different ways, which are not shown in FIG. 3 for reasons of clarity. Firstly, the measuring tip 100, 110 can be cleaned; secondly, the measuring tip 100, 110 can be sharpened; thirdly, material can be deposited on the measuring tip 100, 110 in order to bring the current form back within the admissible variation range with respect to the predetermined or original form of the measuring tip 100, 110 and, finally, the present measuring tip can be removed from the cantilever 140 and a new measuring tip 100, 110 can be deposited on the cantilever 140 at the site of the original measuring tip.

Before the scanning procedure is continued with the repaired measuring tip in step 310, the method can jump back to step 330 from process step 350 and the repaired measuring tip is examined with the aid of the test structure deposited at the position 470, 480 in order to determine whether the repair was successful. For reasons of clarity, this process step is suppressed in the flow chart 300 in FIG. 3.

If the decision is to replace the measuring tip 100, 110 in decision block 345, the method proceeds to step 355, in which the current measuring tip 100, 110 is replaced. Once again, the measuring tip 100, 110 can be replaced in two ways, which are likewise not reproduced in the flowchart 300 in FIG. 3 for reasons of clarity. Firstly, the measuring tip 100 of the probe 150 can be replaced by a new measuring tip of an unused probe. Alternatively, a measuring tip 100, 110 of the probe arrangement 190 can be replaced by a measuring tip 110, 100 that is better suited to sensing the sample, for example the section 430 of the mask 400, than the previously used measuring tip 100, 110. The previously used measuring tip 100, 110 of the probe arrangement 190 still is available for scanning a sample, the contour of which has a smaller aspect ratio than the sample to be analyzed at the current time.

Finally, the method can jump back to process step 330 from step 355 in a further step, likewise not represented in FIG. 3, and the measuring tip 110, 100 of the probe arrangement 190 newly provided for use can be examined prior to its use with the aid of the test structure deposited at 470, 480 in order to ensure that the measuring tip 110, 100 provided for use has a form or geometry that is better suited to scanning the sample than the measuring probe 100, 110 originally used for this purpose.

In an alternative embodiment, the quality of the measuring tip 100, 110 of a test structure is always checked before a start of the examination of a sample, for example the mask 400. In this procedure, the first step of a method according to the invention is the generation of the test structure. In a further modification, a measuring tip 100, 110 is subject to a quality control after a predetermined number of carried out measurement cycles. If the quality control is due, a test structure is generated on the sample and the current contour of the measuring tip 100, 110 is determined with the aid of the generated test structure.

The essential differences between the conventionally used procedure for checking the functionality of a measuring tip 100, 110, which is reproduced in FIG. 2, and the flow chart 300 of FIG. 3 defined in this application are as follows: (a) The method reproduced in FIG. 3 requires no probe or sample change. The time for introducing and removing a probe 150 or test structure is dispensed with. (b) The test structure deposited shortly before its use in situ 470, 480 is new and accordingly has no traces of wear. Further, the only just deposited test structure is substantially free from contaminations. Testing the functionality of the test structure and optionally carrying out a cleaning process for the test structure are dispensed with.

The flowchart 300 presented in FIG. 3 can be carried out in an automated process. This means that depositing a test structure, examining the measuring tip 100, 110 and determining the current form of the measuring tip 100, 110 on the basis of the examination process of the measuring tip 100, 110 with the aid of the deposited test structure can be implemented without human interaction.

Figure 5:
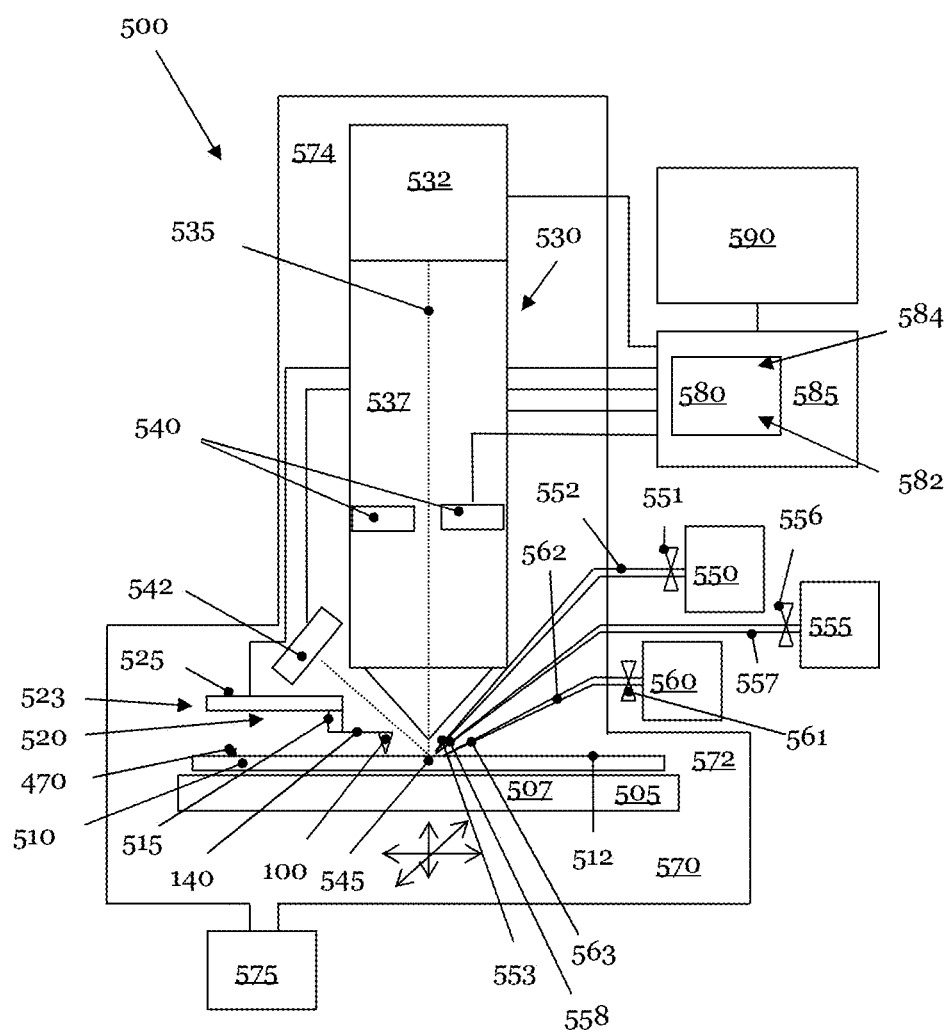
FIG. 5 shows a schematic section through an apparatus for generating a test structure and for examining a measuring tip of an SPM with the aid of the previously generated test structure.

FIG. 5 shows a schematic section through some important components of an apparatus 500, which can be used to carry out the method reproduced in FIG. 3. The apparatus 500 illustrated in FIG. 5 comprises a scanning probe microscope 520 which, in an exemplary apparatus 500, is embodied in the form of a scanning force microscope 520 or an atomic force microscope (AFM) 520. Further, the exemplary apparatus 500 of FIG. 5 comprises a modified scanning particle microscope 530, which is realized as a modified scanning electron microscope (SEM) 530. As already mentioned above, the method described in this application can advantageously be used for optimizing the use of a scanning probe microscope 520, the measuring tip 100, 110 of which is subject to wear and/or dirtying as a result of an interaction with a sample.

The measuring head 523 of the scanning probe microscope 520 is illustrated in the apparatus 500 of FIG. 5. The measuring head 523 comprises a holding apparatus 525. The measuring head 523 is fastened to the frame of the apparatus 500 by use of the holding apparatus 525 (not shown in FIG. 5). The holding apparatus 525 can be rotated about its longitudinal axis which extends in the horizontal direction (not shown in FIG. 5). This allows the measuring tip 100, 110 to be placed under the electron beam 535, wherein the tip 120, 130 of the measuring tip 100, 110 points in the direction of the electron source 532. In an alternative embodiment, the probe 150 or the probe arrangement 190 is put down in a probe store in the vacuum chamber of the apparatus 500. A mechanical unit, not shown in FIG. 5, rotates the measuring tip 100, 110 about the longitudinal axis of the cantilever 140 and places said measuring tip under the electron beam 535 of the SEM 530.

A piezo-actuator 515 which facilitates a movement of the free end of the piezo-actuator 515 in three spatial directions (not illustrated in FIG. 5) is attached to the holding apparatus 525 of the measuring head 523. Fastened to the free end of the piezo-actuator 515, there is a bending bar 140 which is referred to as a cantilever 140 below, as is conventional in the art.

As illustrated in schematically magnified fashion in FIG. 1, the cantilever 140 comprises a holding plate 160 for attachment to the piezo-actuator 515. In place of a single measuring tip 100 of the probe 150, a measuring tip carrier 190 or a probe arrangement 190 may be attached to the measuring head 523 of the SPM 520, said measuring tip carrier or probe arrangement comprising two or more measuring tips. An example of a probe arrangement 190 with five measuring tips 100, 110 is specified in partial image B in FIG. 1.

In the apparatus 500 of FIG. 5, a sample 510 to be examined is fastened to a sample stage 505. The sample surface 512 of the sample 510 to be examined points away from the sample stage 505. By way of example, the sample 510 can be fixed by placing the sample 510 on the bearing points of the sample stage 505 in a vacuum or high vacuum environment or by an electrostatic interaction between the sample stage 505 and an electrically conductive rear side of the sample 510. Moreover, the sample 510 can be held on the sample stage 505 by clamping (not shown in FIG. 5).

The sample 510 may be any microstructured component or structural part. By way of example, the sample 510 may comprise a transmitting or reflecting photomask, for instance the photomask 400 of FIG. 4, and/or a template for nanoimprint technology. Furthermore, the SPM 520 can be used for examining for example an integrated circuit, a microelectromechanical system (MEMS) and/or a photonic integrated circuit.

As indicated by arrows in FIG. 5, the sample stage 505 can be moved by a positioning system 507 in three spatial directions relative to the measuring head 523 of the AFM 520. In the example in FIG. 5, the positioning system 507 is embodied in the form of a plurality of micromanipulators or displacement elements. The movement of the sample stage 505 in the sample plane, i.e., in the xy-plane, can be controlled by two interferometers (not shown in FIG. 5). In an alternative embodiment, the positioning system 507 may additionally contain piezo-actuators (not illustrated in FIG. 5). The positioning system 507 is controlled by signals of a control device 580. In an alternative embodiment, the control device 580 does not move the sample stage 505, but rather the holding apparatus 525 of the measuring head 523 of the AFM 520. It is furthermore possible for the control device 580 to perform a coarse positioning of the sample 510 in height (z-direction) and for the piezo-actuator 515 of the measuring head 523 to perform a precise height setting of the AFM 520. The control device 580 can be part of a computer system 585 of the apparatus 500.

As an alternative or in addition thereto, in a further embodiment, it is possible to divide the relative movement between the sample 510 and the measuring tip 100, 110 between the positioning system 507 and the piezo-actuator 515. By way of example, the positioning system 507 performs the movement of the sample 510 in the sample plane (xy-plane) and the piezo-actuator 515 facilitates the movement of the measuring tip 100, 110 or, in general, of the probe 150 or probe arrangement 190 in the direction of the sample normal (z-direction).

As already mentioned, the exemplary scanning particle microscope 530 of FIG. 5 contains a modified SEM 530. An electron gun 532 produces an electron beam 535, which is directed as a focused electron beam 535 onto the sample 510 at the location 545 by the imaging elements, not illustrated in FIG. 5, disposed in the column 537, said sample being disposed on a sample stage 505. Further, the imaging elements of the column 537 of the SEM 530 can scan the electron beam 535 over the sample 510. Further, the electron beam 535 can be directed on the sample stage 505 or a sample holder (not shown in FIG. 5).

The electrons backscattered from the electron beam 535 by the sample, for example from the position 470 and/or 480, and the secondary electrons generated by the electron beam 535 in the sample 510, for instance at the site 470 and/or 480, are registered by the detector 540. A detector 540 that is disposed in the electron column 537 is referred to as an "in lens detector." The detector 540 can be installed in the column 537 in various embodiments. The detector 540 is controlled by the control device 580. Further, the control device 580 of the SPM 530 receives the measurement data of the detector 540. The control device 580 can generate images from the measurement data and/or the data of the measuring head 523 or the measuring tip 100, 110, said images being presented on a monitor 590.

The control device 580 and/or the computer system 585 may further comprise one or more algorithms that prompt the apparatus 500 to deposit a test structure at the position 470, 480. Further, the algorithm or algorithms can act on the apparatus 500 in order to examine the measuring tip 100, 110 with the aid of the deposited test structure. Moreover, the algorithm or algorithms can be designed to ascertain the current form of the measuring tip 100, 110 from the generated measurement data.

As an alternative or in addition thereto, the scanning probe microscope 530 may have a detector 542 for backscattered electrons or for secondary electrons, said detector being disposed outside of the electron column 537. The detector 542 is likewise controlled by the control device 580.

The electron beam 535 of the SEM 530 can be used to image the sample 510. Moreover, the electron beam 535 of the SEM 530 can also be used to generate one or more test structures at the sites 470, 480 on the sample 510 or the sample stage 505. A test structure can be generated by depositing and/or etching a test structure. For the purposes of generating a test structure and for carrying out further tasks, the apparatus 500 of FIG. 5 comprises three different supply containers 550, 555 and 560.

The first supply container 550 stores a first precursor gas, in particular a first carbon-containing precursor gas. By way of example, a metal carbonyl, for instance chromium hexacarbonyl ($Cr(CO)_6$), or a metal alkoxide, for instance TEOS, can be stored in the first supply container 550. Further precursor gases that are suitable for depositing a test structure with a high carbon content are specified in the third section of this description. With the aid of the precursor gas stored in the first supply container 550, a test structure 470, 480 can be deposited on the sample 510 or the mask 400 in a local chemical reaction, with the electron beam 535 of the SEM 530 acting as an energy supplier in order to split the precursor gas stored in the first supply container 550 at the location at which the test structure 470, 480 should be deposited on the mask 400. This means that an EBID (electron beam induced deposition) process for generating a test structure is carried out by the combined provision of an electron beam 535 and a precursor gas.

An electron beam 535 can be focused onto a spot diameter of a few nanometers. As a result, an EBID process allows the deposition of test structures having structure elements in the low two-digit nanometer range. The combination of a scanning particle microscope 530 and the control device 580 is also referred to as generation unit 584. Further, the combination of a scanning probe microscope 520 and the control device 580 is also referred to as examination unit 582.

In addition to depositing a test structure 470, 480, an EBID process can also be used for depositing material on the tip 120, 130 of a worn measuring tip 100, 110. As a result, a worn tip 120, 130 of a measuring tip 100, 110 can be sharpened again such that its form can be improved at least to such an extent that the latter lies within a predetermined variation range of a new unused measuring tip.

Moreover, a local EBID process can be used to correct the defect 460 if the defect 460 is a defect of lacking material.

The second supply container 555 stores an etching gas, which makes it possible to perform an electron beam induced etching (EBIE) process. With the aid of an electron beam-induced etching process, a test structure deposited by use of an EBID process can be modified in such a way that said test structure has a predetermined contour. A test structure can be transferred by dragging a contamination of the sample 510 on the test structure by the measuring tip 100, 110. As a result of a cleaning process for the test structure 470, 480, the functionality of the latter can be substantially restored. To this end, the test structure at the site 470, 480 is cleaned by an electron beam 535 and, optionally, under the provision of the etching gas stored in the second supply container 555.

Further, the electron beam 535 can be generated in combination with an etching gas for the purposes of generating a test structure by etching a test structure into a sample 510 and/or a sample stage 505

As mentioned above, the measuring tip 100, 110 of the SPM 520 can be rotated about its horizontal axis. This renders it possible to clean a dirtied measuring tip 100, 110 by way of irradiation with the electron beam 535 and optionally by provision of a suitable etching gas, which is kept available in the supply container 555, for example.

If the defect 460 is a defect of excess material, the defect 460 can be removed from the mask 400 by carrying out a local EBIE process. An etching gas can comprise for example xenon difluoride ($XeF_2$), chlorine ($Cl_2$), oxygen ($O_2$), ozone ($O_3$), water vapor ($H_2O$), hydrogen peroxide ($H_2O_2$), dinitrogen monoxide ($N_2O$), nitrogen monoxide (NO), nitrogen dioxide ($NO_2$), nitric acid ($HNO_3$), ammonia ($NH_3$) or sulfur hexafluoride ($SF_6$). Further suitable etching gases are listed in the third section of this description.

An additive gas can be stored in the third supply container 560, said additive gas being added to the etching gas kept available in the second supply container 555 or to the precursor gas stored in the first supply container 550 where necessary. Alternatively, the third supply container 560 can store a second precursor gas or a second etching gas.

The number of supply containers 550, 555, 560 in the apparatus 500 is not set to three supply containers. The minimum number comprises a supply container for storing at least one precursor gas for depositing a test structure. Upwards, the number of supply containers of the apparatus 500 can be flexibly adapted to the process gases needed by the apparatus 500 for the processing processes to be carried out.

In the device 500 of FIG. 5, each of the supply containers 550, 555 and 560 has its own control valve 551, 556 and 561 in order to monitor or control the amount of the corresponding gas that is provided per unit time, i.e., the gas volumetric flow at the site 545 of the incidence of the electron beam 535 on the sample 510, on the sample holder or on the measuring tip 100, 110. The control valves 551, 556 and 561 are controlled and monitored by the control device 580. This allows partial pressure conditions of the gases provided at the processing location 545 for depositing a test structure at the position 470, 480 or for releasing the further gases provided for the above-described processes to be set in a broad range.

Furthermore, in the exemplary apparatus 500 of FIG. 5, each supply container 550, 555 and 560 has its own gas feed line system 552, 557 and 562, which ends with a nozzle 553, 558 and 563 in the vicinity of the point of incidence 545 of the electron beam 535 on the sample 510, on the sample stage 510 or on the measuring tip 100, 110.

In the example illustrated in FIG. 5, the valves 551, 556 and 561 are disposed in the vicinity of the corresponding containers 550, 555 and 560. In an alternative arrangement, the control valves 551, 556 and 561 can be installed in the vicinity of the corresponding nozzles (not shown in FIG. 5). Unlike the illustration shown in FIG. 5 and without preference at the present time, it is also possible to provide one or more of the gases stored in the containers 550, 555 and 560 non-directionally in the lower part 572 of the vacuum chamber 570 or the reaction chamber 572 of the apparatus 500. In this case, it would be expedient for the apparatus 500 to have installed a stop (not illustrated in FIG. 5) between the lower reaction space 572 and the upper part 574 of the apparatus 500, which contains the column 537 of the SEM 530, which provides the focused electron beam 535, in order to prevent negative pressure that is too low in the upper part 574 of the apparatus 500.

The supply containers 550, 555 and 560 can have their own temperature setting element and/or control element, which enables both cooling and heating of the corresponding supply containers 550, 555 and 560. This makes it possible to store and in particular provide the carbon-containing precursor gas(es) and/or the etching gas(es) at the respectively optimum temperature (not shown in FIG. 5). Furthermore, the feed line systems 552, 557 and 562 can comprise their own temperature setting elements and/or temperature control elements in order to provide all the processing gases at their optimum processing temperature at the point of incidence 545 of the electron beam 535 on the sample 510, on the sample stage 505 if the test structure 470, 480 is deposited on the latter or on the measuring tip 100, 110 (likewise not indicated in FIG. 5). The control device 580 can control the temperature setting elements and the temperature control elements both of the supply containers 550, 555, 560 and of the gas feed line systems 552, 557, 562. When processing the sample 510 by use of EBID and/or EBIE processes, the temperature setting elements of the supply containers 550, 555 and 560 can further be used to set the vapor pressure of the precursor gases stored therein by way of the selection of an appropriate temperature.

The apparatus 500 illustrated in FIG. 5 can be operated under ambient conditions or in a vacuum chamber 570. Depositing a test structure at one of the sites 470, 480 necessitates a reduced pressure in the vacuum chamber 570 relative to the ambient pressure. For this purpose, the apparatus 500 of FIG. 5 comprises a pump system 575 for generating and for maintaining a reduced pressure required in the vacuum chamber 570. With closed control valves 551, 556 and 561, a residual gas pressure of <$10^{-4}$ Pa is achieved in the vacuum chamber 570 of the apparatus 500. The pump system 575 can comprise separate pump systems for the upper part 574 of the apparatus 500 for providing the electron beam 535 of the SEM and for the lower part 572 or the reaction chamber 572 (not shown in FIG. 5).

Conventionally, test structures are typically generated on test bodies by use of production methods that are known from the field of producing semiconductor components. As a result of these production methods, significant restrictions arise in respect of the contour of the test structure. As a result, the geometry of the measuring tip 100, 110 of an SPM 520 can only be determined incompletely. Most of these restrictions are avoided by producing a test structure with the aid of an EBID and/or EBIE process, which is carried out by the apparatus 500. Additionally, an EBID process facilitates flexible matching of a test structure to the form of the measuring tip 100, 110 used by the SPM 520.

Figure 6:
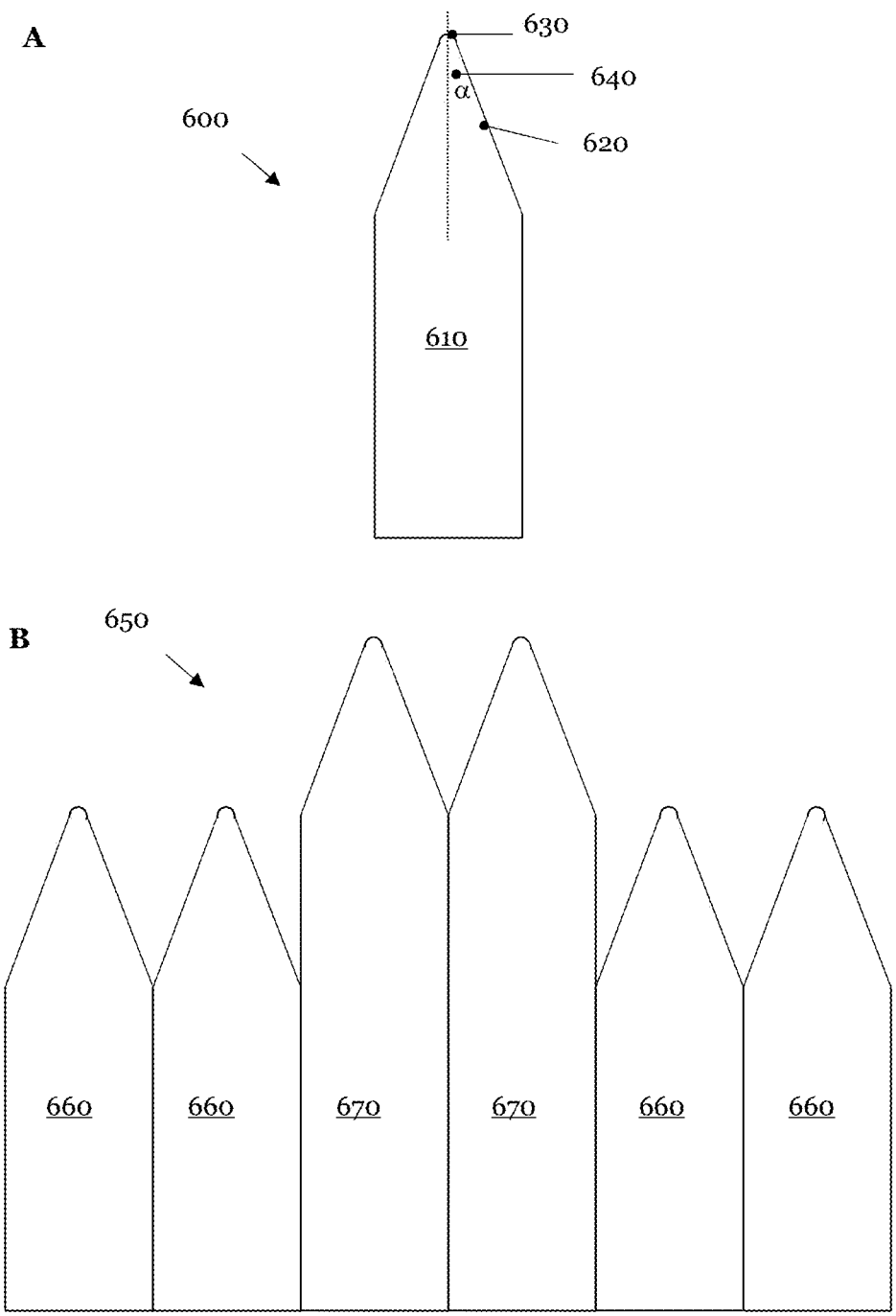
FIG. 6 reproduces a section through two embodiments of a test structure.

In partial image A, FIG. 6 shows a section through an embodiment of a test structure 600. The test structure 600 comprises a cylindrical shaft 610, which is adjoined by a conically tapering tip region 620 that ends in a hemispherical tip 630. As explained above in the context of FIG. 5, the test structure 600 can be deposited from a carbon-containing precursor gas, which is stored in the supply container 550 in the exemplary apparatus 500. The shaft 610 may have a diameter that ranges from the single-digit micrometer range down to the three-digit nanometer range. The length of the shaft 610 of the test structure 600 typically has similar dimensions. The aperture angle $\alpha$ 640 of the tip region 620 ranges from 40° to approximately 10°. The radius of curvature of the tip 630 ranges from 100 nm down to the single-digit nanometer range. For the purposes of depositing the shaft 610, the focused electron beam 535 is focused at the site 470, 480 at which the test structure should be deposited, while the precursor gas is provided at the same time. The contour or geometry of the generated test structure depends on the spot diameter in the focus, on the kinetic energy of the electrons of the electron beam 535, on the current intensity and the irradiation time of the electron beam 535 and on the gas pressure of the employed precursor gas.

A test structure 600 predominantly comprising carbon is advantageous in that the test structure 600 can be removed from the mask 400 again by use of a conventional cleaning process at the end of a mask production or mask repair process. This opens up the possibility of depositing the test structure 600 not only on absorbing pattern elements 450 of the mask 400 but also on phase-shifting pattern elements or on the substrate 430 of a mask 400. Moreover, a test structure predominantly comprising carbon can be used in general for optimizing the examination of optical elements with the aid of an SPM 520, which optical elements have no pattern elements 450.

In another embodiment, it is possible to deposit permanent test structures 600 on the sample 510 or on a substrate with the aid of the SPM 520. To this end, for example, the precursor gas TEOS can be stored in the first supply container 550. The permanent test structure 600 can remain on the sample 510 and can be used, during the service life of the sample 510, by other scanning probe microscopes for optimizing the examination of the sample 510 with an SPM 520. In a further embodiment, the test structure 600 can already be deposited at the position 470 or 480 during the production of the sample 510 (not illustrated in FIG. 6).

The test structure 600 of FIG. 6 substantially has the form of the measuring tip 100, 110. Should the contour of the test structure 600 and the form or geometry of the measuring tip 100, 110 be substantially identical, the deconvolution process for determining the form of the measuring tip 100, 110 from sensing the test structure 600 with a measuring tip 100, 110 is simplified. As explained in the third section of this description, the deconvolution process is already described in many documents. Therefore, a presentation of this process here is dispensed with. Instead, reference is made to the documents listed above.

The test structure 600 of FIG. 6 is rotationally symmetric. However, this is not necessary. Rather, the cross section of a test structure 600 can be elliptical or polygonal. By way of example, a test structure 600 can have a pyramidal structure (not shown in FIG. 6).

Partial image B of FIG. 6 presents a section through a test structure 650, in which a plurality of the test structures 600 reproduced in partial image A are combined. The elements 660 of the test structure 650 are substantially identical to the test structure 600 of partial image A. The elements 670 merely differ from the test structure 600 by virtue of a greater length of the shaft 610 of the test structure 600. The test structure 650 of partial image B of FIG. 6 is deposited at one of the sites 470 and/or 480 on the mask 400 or on the sample 510 in an EBID process, similar to the test structure 600.

In order to generate a test structure 650 whose structure elements differ in a plurality of properties, it is possible to generate elements 660 and 670 which have different radii of curvatures and/or different aperture angles in addition to a different lengths of their shafts 610. As a result, it is possible to deposit a test structure 650 that is suitable for examining measuring tips 100, 110 whose original forms or geometries are designed for analyzing different samples 510 and accordingly have different forms. Moreover, it is expedient to have a test structure 650 with a plurality of different structure elements for examining worn and/or dirtied measuring tips 100, 110.

Following the production of the test structures 600 and 650, these can be imaged with the aid of the electron beam 535 of the SEM 530 in order to check that the geometry or the contour of the test structures 600 and 650 in fact has the intended form.

Figure 7:
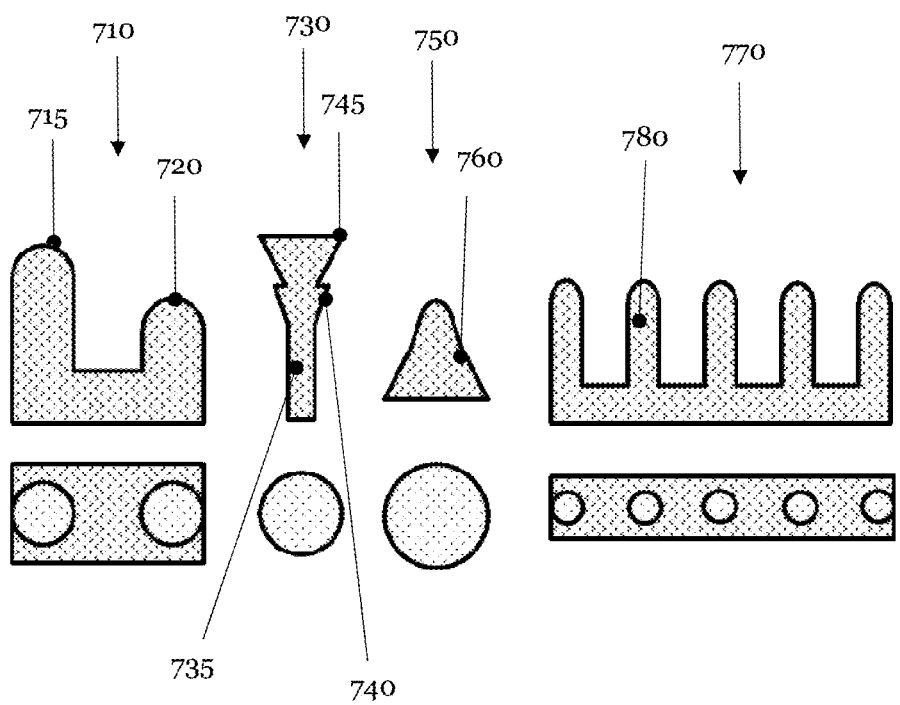
FIG. 7 presents sections and plan views of four further examples of test structures.

FIG. 7 schematically represents further examples of test structures 710, 730, 750 and 770. The upper row of FIG. 7 shows sections through the test structures 710, 730, 750 and 770 while the lower row reproduces plan views of the test structures 710, 730, 750 and 770. The test structure 710 has two structure elements 715, 720, which have tip regions with the same contour but which differ in terms of the length of their shafts. As explained below, the test structure 710 is suitable for detecting a lateral offset within the scope of determining a position of the measuring tip 100, 110, which lateral offset is caused by an oblique movement of the measuring tip 100, 110.

The test structure 730 comprises a shaft 735 with two indented or undercut structure elements 740 and 745, wherein the structure element 745 disposed at the tip of the test structure 730 has a greater diameter than the structure element 740 situated therebelow. The test structure 730 allows a clear identification as to whether deviation of the movement of the measuring tip 100, 110 with respect to the sample normal exceeds a limit value. Overall, the test structures 710 and 730 are designed to detect the movement direction of a vibrating measuring tip 100, 110 or of a measuring tip operated in the step-in mode of operation.

Indented structure elements 740, 745 can be produced by suitable guidance of the electron beam 535. If the area irradiated by the electron beam is increased during the production of the test structure 730, undercut or indented structure elements 740, 745 are formed. The area exposed by the electron beam 535 can be increased by virtue of increasing the spot diameter of the electron beam 535 on the test structure 730 or by virtue of moving a spot diameter of the focus with an unchanged size in a lateral direction.

The test structure 750 of FIG. 7 was deposited in the form of a cone with a bend 760 along the side face 755. Moreover, the test structure 750 has a tip with a defined radius of curvature.

Finally, the exemplary test structure 770 of FIG. 7 comprises five substantially identical, needle-shaped structure elements 780. Typically, the length of the structure elements 780 is shorter than the length of the measuring tip 100, 110. The radius of curvature of the measuring tip 100, 110 can be determined with the aid of the radii of curvature of the needle-shaped structure elements 780 of the test structure 770. Moreover, whether the measuring tip 100, 110 reaches the base between two of the structure elements 780 can be determined on the basis of the test structure 770. Should this be the case, the diameter of the measuring tip 100, 110 is smaller than the distance between adjacent structure elements 780 of the test structure 770. In an alternative embodiment, the distance and the length of the structure elements 780 of the test structure 770 can be varied in order to design the test structure 770 for analyzing various forms of the measuring tips 100, 110.

Ideally, the test structures 600, 650, 710, 730, 750 and 770 should have perfect contours. This means that the shafts 610 of the structure elements 560, 570, 715, 720, 780 of the test structures 600, 650, 710, 730, 750, 770 should be perpendicular and the aperture angles of the structure elements and their radii of curvatures should be small in relation to the dimensions of the corresponding elements of the measuring tip 100, 110. However, there are physical restrictions on the production of structure elements 560, 570, 715, 720, 740, 745, 780 for test structures 650, 710, 730, 770.

An option for circumventing these restriction lies in the deposition of a test structure 600, the contour of which comes as close as possible to the form or geometry of the employed measuring tip 100, 110. This is presented in partial figure A of FIG. 6. A second option for circumventing the production restrictions exploits the production time and the production type for the production structure. When depositing the test structure 600, 650, 710, 730, 750, 770, for example at the position 470 and/or 480, the original form or geometry of the measuring tip 100, 110 used by the SPM 720 is known. Moreover, depositing the test structure 600, 650, 710, 730, 750, 770 in situ facilitates the adaptation of the test structure to the form or geometry of the measuring tip 100, 110 to be examined. Using this, it is possible to design, in particular, the arrangement of the structure elements 560, 570, 715, 720, 735, 740, 745, 780 on the test structure in addition to their form in such a way that the arrangement thereof can be exploited to the best possible extent for the examination of the measuring tip 100, 110.

FIG. 8 shows schematic sections through two examples of test structures 810 and 850, which were etched into a sample 510. By way of example, the sample 510 may comprise the photomask 400. This means that the test structures 810 and 850 can be etched into the edge 410 of the photomask 400, for instance at the position 470. It is also possible to etch the test structures 810 and 850 into a pattern element 450 of a photomask 450, for instance at the position 480. However, the case specified last assumes the pattern elements 450 are thick enough so that the residual thickness of the pattern element 450 still remaining after etching substantially does not impair the function of said pattern element.

Five depressions 815, 820, 825, 830, 835 are etched into the sample 510 in the test structure 810 of the upper partial image A in FIG. 8. The depressions 815, 820, 825, 830, 835 have different diameters and substantially the same depth. The depressions 815, 820, 825, 830, 835 preferably have a rectangular, square or round form in the plane parallel to the sample surface 512. The test structure 810 represents the counterpart to the test structure 770, with the difference that the depressions of the test structure 810 have different diameters. It is also possible to etch into a sample a test structure whose depth, whose diameter and/or whose forms differ, provided the dimensions are known. Further, two or more substantially identical test structures 810 can be etched successively into a sample in order to always have available a non-worn and/or non-dirtied test structure 810 when required.

The test structure 850 of the lower partial image B comprises a depression 855, the side walls 870 and 880 of which do not form a right angle with respect to the sample surface 512. The sharp edges 860 of the test structure 850 can be used, alone or in combination with the lower side walls 880, for determining the contour and/or the radius of curvature of the measuring tip 100, 110.

The test structures 810 and 850 can be generated with the aid of the electron beam 535 of the SEM 530 of the apparatus 500 and one of the etching gases stored in the supply container 555, i.e., can be generated by use of an EBIE process. Etching gases suitable to this end are listed above.

Figure 9:
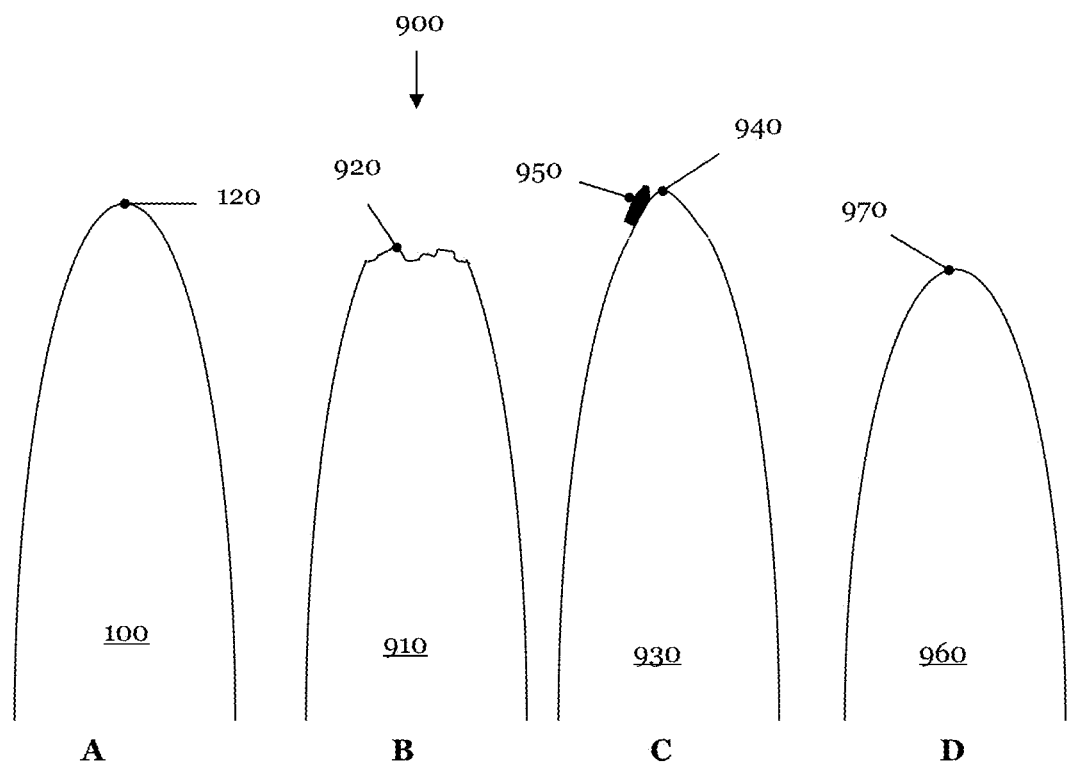
FIG. 9 shows an unused measuring tip in partial image A, reproduces a worn measuring tip in partial image B, illustrates a contaminated measuring tip in partial image C and shows a measuring tip repaired by an electron-beam-induced etching process in partial image D.

The repair of a worn or dirtied measuring tip 100, 110 is discussed on the basis of FIG. 9. Partial image A presents a measuring tip 100, said measuring tip being new or the tip 120 of which having substantially no traces of wear that can be traced back to an interaction with a sample 400, 510. In the case of the used measuring tip 910 of partial image B, the tip 920 thereof has clear traces of use, which result in visible wear in comparison with the original tip 120. Partial image C likewise shows a used measuring tip 930. The tip 940 of the measuring tip 930 was only slightly rounded by the interaction with a sample 400, 510 and therefore subjected to little wear. However, a particle 950 has been deposited on the tip 940 of the measuring tip 930. The particle 950 changes the measurement data of the measuring tip 930 for a sample surface 512 in comparison with the new or substantially unworn measuring tip 100 of partial image A. However, it is also possible for the tip of a used measuring tip 910, 930 to both have a worn tip 920 and be dirtied (not illustrated in FIG. 9).

The damage to the measuring tips 910 and 930 of partial images B and C can be repaired by a local electron beam-induced etching process using the electron beam 535 of the SEM 530 and an etching gas, which is stored in the supply container 555. Partial image D illustrates the repaired measuring tip 960. The contour of the tip 970 of the repaired measuring tip 960 is substantially the same as the contour of the tip 120 of the new, i.e., unused, measuring tip 100. Consequently, the repaired measuring tip 960 supplies substantially the same measurement data as the new measuring tip 100. The only difference between the two measuring tips 100 and 960 lies in the slightly shorter length of the repaired measuring tip 960. It is an important advantage of the discussed repair process for the measuring tip 100, 110 that—as explained in the context of FIG. 3—it is possible to use the test structure 600, 650, 710, 730, 750, 770, 810, 850 in order to check, without great outlay, that the repair process has in fact yielded the intended result.

Further problems that can be solved by depositing an appropriate test structure 710, 730, 810, 850 in situ on a sample 400, 510 or the sample stage 505 are explained below. Partial figures A and B of FIG. 10 illustrate a section of the photolithographic mask 400. The photomask 400 comprises a substrate 440 and absorbing pattern elements 450. The width of the pattern elements 450 is denoted by the double-headed arrow 1020 and the height of said pattern elements is denoted by the double-headed arrow 1010. Typical values for both quantities lie in the two-digit to three-digit nanometer range.

In partial image A, an ideal needle-shaped measuring tip 1040, which moves perpendicular to the sample surface 512, senses the mask 400. The movement direction of the ideal, arbitrarily thin measuring tip 1040 is symbolized by the double-headed arrow 1050. The line 1030 specifies the contour that the measuring tip 1040 generates of the mask 400 or the surface thereof.

Partial image B of FIG. 10 presents the contour of the mask 400, when the latter is sensed by real measuring tips 1070 or 1080. Here the measuring tips 1070 and 1080—similar to the ideal measuring tip 1040 of partial image A—move in the z-direction, i.e., parallel to the normal of the mask 400. The measuring tip 1070, which is asymmetrical with respect to the longitudinal axis of the measuring tip 1070, generates an asymmetric contour 1060 of the mask 400. Additionally, regions of the sample surface 512 or of the surface of the mask 400 that cannot be reached by the measuring tips 1070 and 1080 arise due to the finite extent of the measuring tips 1070 and 1080. In partial image B of FIG. 10, these are the regions 1090 and 1095. The measuring tips 1070 and 1080 cannot obtain any information about the contour of the sample 400, 510 from the regions 1090 and 1095. The control device 580 or the computer system 585 of the apparatus can generate a map from the regions 1090 and 1095, said map labeling the parts of the sample 400, 510 where the measuring tip 100, 110 of the SPM 520 cannot interact with the sample 400, 510.

Figure 11:
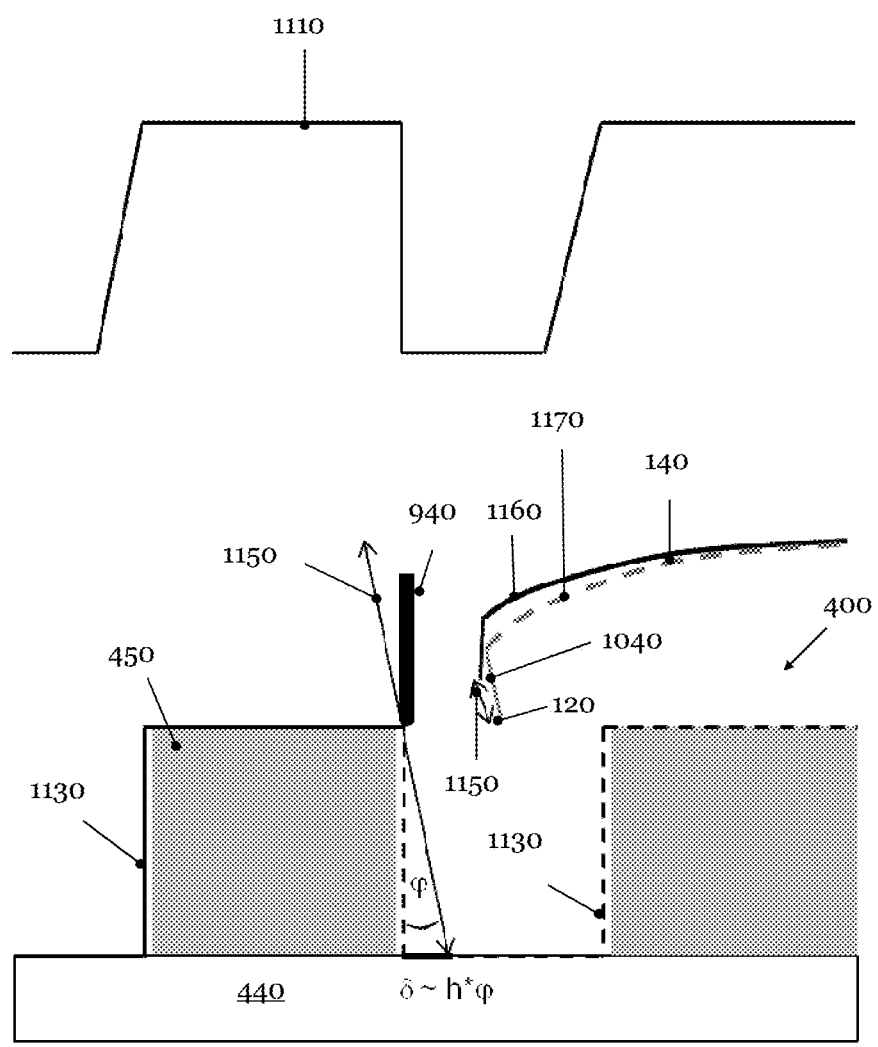
FIG. 11 repeats the sensing process of partial image A in FIG. 10, in which an ideal measuring tip oriented with respect to the sample or mask normal carries out an oblique or non-perpendicular movement with respect to the mask normal.

FIG. 11 elucidates the sensing of the photomask 400 using the ideal measuring tip 1040 of partial image A of FIG. 10. However, in contrast to partial image A of FIG. 10, the measuring tip 1040 does not carry out any movement in the z-direction. Instead, the oblique movement 1150 of the measuring tip 1040 deviates from the perpendicular or the normal direction by the angle cp. In the example illustrated in FIG. 11, the lateral movement of the ideal measuring tip 1040 arises from a curvature of the cantilever 140 toward the sample surface 512. The tip 120 of the measuring tip 1040 carries out a complicated movement. The two reference signs 1160 and 1170 specify the position of the measuring tip 1040 at the two reversal points of the vibrations of the cantilever 140. The curvature of the cantilever 140 or the movement direction 1150 of the measuring tip 1040 yields a deviation of the measured contour, depending on the height of the pattern element 450 and being represented by the curve 1110 in FIG. 11, from the actual contour of the pattern element: $\delta = h \cdot \tan \varphi \approx h \cdot \varphi$.

Figure 12:
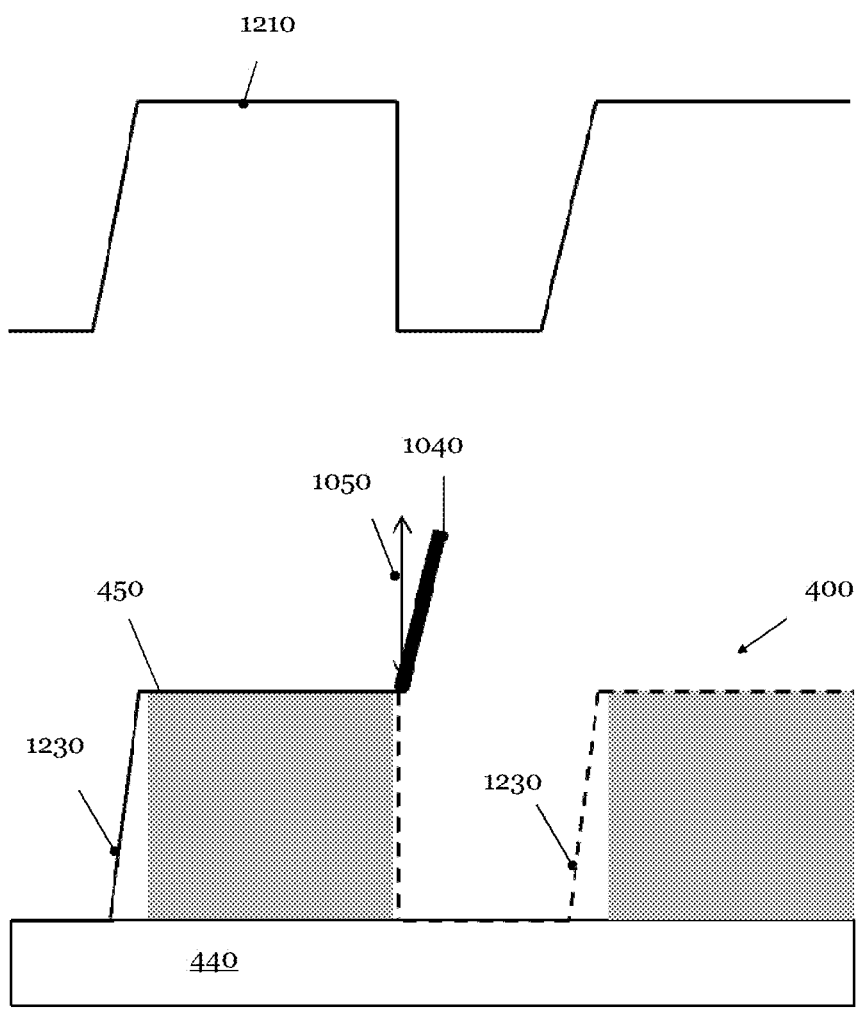
FIG. 12 repeats the sensing process of partial image A in FIG. 10, in which an ideal measuring tip, i.e., a measuring tip that has no lateral extent, carries out a movement along the mask normal and wherein the orientation of the measuring tip has an angle that differs from zero with respect to the mask normal.

In FIG. 12, the ideal measuring tip 1040 senses the photomask 400 or a section thereof using a perpendicular movement 1050. Unlike in partial image A of FIG. 10, the measuring tip 1040 however has an angle with respect to the surface normal that differs from zero. The curve 1230 presents the regions in which the tip 120 of the ideal measuring tip 1040 reaches the surface of the mask 400 and the regions in which this is not the case. The curve 1210 specifies the contour of the mask 400 which is generated by the obliquely positioned measuring tip 1040 by way of carrying out a movement in the z-direction of the sample 510 or the mask 400.

What can be gathered from the comparison of the curves 1110 and 1210 of the exemplary movement forms of the tip 120 of the measuring tip 1040 illustrated in FIGS. 11 and 12 is that two different movements 1150 and 1050 of an ideal measuring tip 1040 may lead to a substantially identical contour of the mask 400. This is very disadvantageous as this ambiguity makes interpretation of the measurement data generated by use of the scanning probe microscope 520 significantly more difficult. In reality, this situation is made even more complicated by the fact that the effects of the real measuring tip 1070 or 1080, discussed in partial image B of FIG. 10, are still superposed on the contours 1110 and 1210.

FIG. 13 elucidates how a decision can be made with the aid of the test structure 730 of FIG. 7 as to which form of movement the measuring tip 1040 carried out when recording the measurement data in FIGS. 11 and 12. Partial figure A of FIG. 13 shows the sensing of the twice undercut test structure 730 using a measuring tip 100, the associated cantilever 140 of which carries out a vibration in the z-direction 950. The right-hand side specifies the measured contour 1310, which is yielded by sensing the test structure 730 with this movement form of the measuring tip. The symmetry of the test structure 730 and of the sensing process is reflected in the symmetry of the contour 1310.

On the left, partial image B of FIG. 13 presents the scanning of the measuring tip 100 over the test structure 730, wherein the measuring tip 100 carries out a vibration in the z-direction and, at the same time, has an angle with respect to the movement direction 1050, i.e., the z-direction, that differs from zero. A first option for carrying out such a movement of the measuring tip 100 requires the AFM measuring head 523 being tilted. For a second option, the cantilever 140 of the probe 150 or of the probe arrangement 190 is embodied as a bimetal. The cantilever 140 warps as a result of an asymmetric photothermal actuation of the cantilever 140 with respect to its longitudinal axis, as a result of which there is a change in the orientation of the measuring tip 100 with respect to the surface normal. A photothermal actuation of the cantilever 140 can be carried out by irradiation with a laser beam. The measured contour 1320 of the test structure 730, which generates this movement of the measuring tip 100, 110, is illustrated on the right-hand side of partial image B. The asymmetry between orientation of the test structure 730 and the measuring tip 100, 110 is uncovered by way of a non-symmetric contour 1320.

Finally, partial image C of FIG. 13 shows a scanning procedure of the measuring tip 100 over the test structure 730, in which the movement 1350 of the measuring tip 100 is carried out parallel to the orientation of the measuring tip 100 and wherein both are inclined by an angle in relation to the z-direction or the sample normal. The contour 1330 of the test structure 730 generated by use of this scanning procedure is specified to the right in partial image C. An asymmetric measured contour 1330 of the test structure 730 arises from the sensing procedure on account of the non-symmetrical movement of the measuring tip 100 with respect to the test structure 730. The movement 1350 of the measuring tip 100 away from the vertical line of symmetry of the test structure 730, i.e., at an angle with respect to the z-direction, however only facilitates the detection of the second undercut structure element 740, which is expressed in the bend 1360 in the contour 1330 of the test structure 730.

Consequently, sensing the test structure 730 using the movement forms illustrated in partial images B and C allows discrimination as to which movement the measuring tip 100, 110 carried out when scanning the contours 1110 and 1210 of FIGS. 11 and 12. Consequently, the test structure 730 allows the ambiguity arising in FIGS. 11 and 12 to be resolved and allows the contours 1110 and 1210 of the sample 510 or of the mask 400 to be unambiguously linked to the forms of movement carried out by the measuring tip 100.

Figure 14:
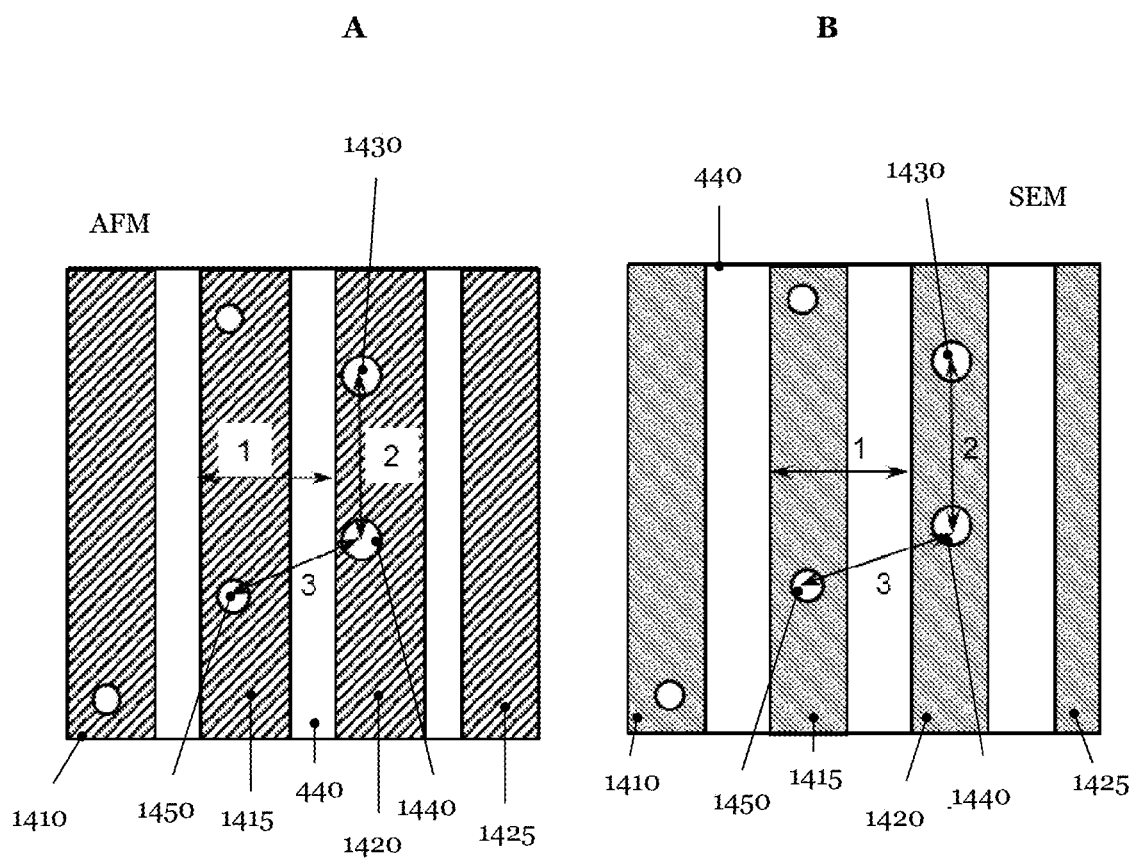
FIG. 14 reproduces the analysis of marks at different heights on pattern elements of a mask section with the aid of an atomic force microscope (AFM) in the left partial image A and presents, in the right partial image B, the section of the mask that was sensed with the aid of a scanning electron microscope (SEM)

FIG. 14 and table 1 below illustrate a topic that may occur during the superposition of AFM and SEM images. The left partial image A of FIG. 14 shows an AFM image of a section of a photomask 400, which comprises a substrate 440 and pattern elements 1410, 1415, 1420 and 1425. One mark 1450 is deposited on the pattern element 1415. Two marks 1430 and 1440 are deposited on the pattern element 1420. The marks 1430, 1440 and 1450 may have been deposited with the aid of an EBID process using the apparatus 500 of FIG. 5. The deposited marks 1430, 1440 and 1450 have different heights. The marks 1430 and 1440 have a similar height of 66 nm and 65 nm, respectively. The mark 1450 of the pattern element 1415 has a height of 46 nm. The height of the markings 1430, 1440 and 1450 was ascertained by sensing the markings using the measuring tip 100, 110 of an SPM 520.

The markings 1430, 1440 and 1450 can be embodied as a test structure 600, 650, 710, 730, 750, 770, 810, 850 (not shown in FIG. 14). At the same time, the markings 1430, 1440 and 1450 serve to align the AFM image (partial image A) with an SEM image (partial image B) or, generally, with a scanning particle beam image. The two images are super-posed in one application example in order to set the position of a defect 460 in the SEM image for the purposes of repairing the defect 460 with the aid of the SEM 530 of the apparatus 500 of FIG. 5. Additionally, the markings 1430, 1440 and 1450 can be used for correcting the drift of the SEM 530 during a correction of the defect 460.

Partial image B presents the section of the mask 400 of partial image A, which was imaged with the electron beam 535 of the SEM. In the partial images A and B, double-headed arrows 1, 2 and 3 denote measurements which were carried out with the measuring tip 100, 110 of the probe 150 or probe arrangement 190 of the SPM 520 in partial image A and with the electron beam 535 of the SEM 530 in partial image B. The measurement data are summarized in the following table.

TABLE 1

| No. of the measurement | Distance AFM [nm] | Height of the marking [nm] | Distance SEM [nm] | Note |
|---|---|---|---|---|
| 1 | 216 | | 216 | Set equal (reference) |
| 2 | 265 | 66 (1330) 65 (1340) | 266 | Good correspondence |
| 3 | 239 | 65 (1340) 46 (1350) | 229 | Poor correspondence |

The first measurement serves to determine a reference or reference distance between the AFM image and the SEM image. To this end, the distance of two pattern elements is ascertained both with the SPM 520 and with the SEM 530. In the example illustrated in FIG. 14, this is the distance between the pattern elements 1415 and 1420.

In the second measurement, the distance between the markings 1430 and 1440 is measured both by sensing the markings 1430 and 1440 with the measuring tip 100, 110 and by scanning the electron beam 535 of the SEM 530 over the markings 1430 and 1440. The values measured for the distance between the two markings 1430 and 1440 differs by less than 0.5%.

The third measurement is carried out in order to determine the distance between the markings 1440 and 1450 with the SPM 520 and the SEM 530 of the apparatus 500. As may be gathered from the last line of table 1, the difference in the measurement results for the distance between the markings 1440 and 1450 from the two metrology appliances lies between 4% and 5%, and hence it is significantly greater than for the second measurement.

FIG. 15 uncovers the reason for the great difference in the measurement results between the second and the third measurement in table 1. FIG. 15 once again shows the mask 400, on which the test structure 710 of FIG. 7 has been deposited at the position 470 and/or 480. The test structure 710 has two structure elements 715 and 720, the heights of which differ. The double-headed arrow 1510 in FIG. 15 specifies the distance between the two structure elements 715 and 720 of the test structure 710. The distance 1510 is measured when sensing the test structure 710, for example with the electron beam 535.

The distance 1510 would also be measured by scanning the SPM 520 over the test structure 710 if the structure elements 715 and 720 thereof would have the same height, to be precise independently of the movement direction of the measuring tip 100, 110 of the SPM 520 (cf. the measurement No. 2 in table 1). Further, the SPM 520 would substantially measure the distance 1510 between the structure elements 715 and 720 of the test structure 710 if the movement of the measuring tip 100, 110 when sensing the test structure 710 is implemented parallel to the sample normal, i.e., in the z-direction.

The curve 1550 of FIG. 15 shows the contour of the test structure 710 that arises if the measuring tip 100 carries out a vibration 1560 when scanning the test structure 710, the direction of said vibration having an angle with respect to the sample normal that differs from zero. The distance 1520 between the structure elements 715 and 720 of the test structure 710 is ascertained from the contour 1550. The distance 1520 measured by the SPM 520 is greater than the actual distance 1510 and is afflicted by a systematic error. A non-perpendicular movement of the measuring tip 100 in combination with different heights of the structure elements 715 and 720 of the test structure 710 leads to a height-dependent lateral offset of the measurement of an SPM 720. This height-dependent lateral offset explains the large difference in the measurements in the last row of table 1.

By depositing a suitable test structure, for example the test structure 710 that comprises two structure elements 715 and 720 with different lengths or heights, it is possible to analyze the effect of the movement of the measuring tip 100, 110 on the measurement data generated by an SPM 520; i.e., the systematic error of a height-dependent lateral offset can be calculated and the measurement can be corrected accordingly.

In a manner similar to the example explained above, the further application example described in the context of FIGS. 14 and 15 shows that test structures 600, 650, 710, 730, 750, 770, 810, 850, in addition to examining the measuring tip 100, 110 in respect of wear and/or contamination, can also be used for the detailed analysis of the movement carried out by the measuring tip 100, 110 during a procedure of sensing a sample 400, 510.

What is claimed is:

1. A method for examining a measuring tip of a scanning probe microscope, wherein the method includes the following steps:
   a. generating at least one first test structure before a sample is analyzed, or after the sample has been analyzed, by the measuring tip, wherein generating the at least one first test structure is carried out on a sample stage, and wherein generating the at least one first test structure comprises a particle beam-induced deposition of the at least one first test structure and/or a particle beam-induced etching of the at least one first test structure; and
   b. examining the measuring tip with the aid of the at least one first test structure deposited on and/or etched in the sample stage with the aid of the particle beam.

2. The method of claim 1, wherein the sample comprises a photolithographic mask, a wafer, or a template for the nanoimprint lithography.

3. The method of claim 2, wherein at least one second test structure is generated on an edge of the photolithographic mask, on which edge substantially no radiation at an actinic wavelength is incident.

4. The method of claim 3, wherein the at least one second test structure is generated on a pattern element of the photolithographic mask.

5. The method of claim 1, further including the following step: scanning the sample by a particle beam for finding a defect in the sample.

6. The method of claim 5, further comprising the step of: generating at least one mark on the sample for the purpose of finding the defect by the measuring tip of the scanning probe microscope.

7. The method of claim 6, wherein the at least one mark comprises at least one second test structure.

8. The method of claim 1, wherein a contour of the at least one first test structure is matched to a contour of the sample.

9. The method of claim 8, wherein the contour of the at least one first test structure is matched to the form of the measuring tip.

10. The method of claim 8, wherein the contour of the at least one first test structure is embodied to detect a movement direction of the measuring tip that deviates from a sample normal.

11. The method of claim 1, wherein the at least one first test structure comprises at least one structure element with an undercut.

12. The method of claim 1, wherein the at least one first test structure is generated at a site of the sample stage at which the at least one first test structure substantially does not impair a function of the sample and/or the sample stage.

13. The method of claim 1, wherein generating the at least one first test structure comprises: providing a focused particle beam and at least one precursor gas at the site at which the at least one first test structure is generated.

14. The method of claim 1, wherein the at least one first test structure is generated on the sample stage when the sample stage is produced.

15. The method of claim 1, wherein steps a. and b. are carried out in vacuo without breaking the vacuum.

16. The method of claim 1, wherein examining the measuring tip further comprises: scanning the measuring tip over the at least one first deposited and/or etched test structure.

17. The method of claim 1, wherein examining the measuring tip further comprises: imaging the at least one first test structure by way of a focused particle beam.

18. An apparatus for examining a measuring tip of a scanning probe microscope, comprising:
   a. a generation unit that is embodied for particle beam-induced deposition and/or etching of at least one first test structure on or in a sample stage before a sample is analyzed, or after the sample has been analyzed, by the measuring tip; and
   b. an examination unit that is embodied to examine the measuring tip with the aid of the at least one first test structure deposited on and/or etched in the sample stage with the aid of a particle beam.

19. The apparatus of claim 18, further comprising a displacement unit that is embodied to bridge a distance between a point of incidence of a particle beam of the generation unit on the sample and/or the sample stage and an interaction location between the sample and/or the sample stage and the measuring tip.

20. The apparatus of claim 18, embodied to carry out the method steps comprising:
   generating the at least one first test structure before the sample is analyzed, or after the sample has been analyzed, by the measuring tip, wherein generating the at least one first test structure is carried out on the sample stage, and wherein generating the at least one first test structure comprises a particle beam-induced deposition of the at least one first test structure and/or a particle beam-induced etching of the at least one first test structure; and
   examining the measuring tip with the aid of the at least one first test structure deposited on and/or etched in the sample stage with the aid of the particle beam.

21. A non-transitory computer readable medium storing A computer program comprising instructions that, when executed by a computer system of the apparatus, prompt a control device of the apparatus to carry out the method steps comprising:
   generating at least one first test structure before a sample is analyzed, or after the sample has been analyzed, by the measuring tip, wherein generating the at least one first test structure is carried out on a sample stage, and wherein generating the at least one first test structure comprises a particle beam-induced deposition of the at least one first test structure and/or a particle beam-induced etching of the at least one first test structure; and examining the measuring tip with the aid of the at least one first test structure deposited on and/or etched in the sample stage with the aid of the particle beam.

\* \* \* \* \*

UNITED STATES PATENT AND TRADEMARK OFFICE
CERTIFICATE OF CORRECTION

| | |
|---|---|
| PATENT NO. | : 11,680,963 B2 |
| APPLICATION NO. | : 17/551613 |
| DATED | : June 20, 2023 |
| INVENTOR(S) | : Kinga Kornilov, Christof Baur and Markus Bauer |

It is certified that error appears in the above-identified patent and that said Letters Patent is hereby corrected as shown below:

On the Title Page

Column 2 item [56], Line 2, delete "ofthe" and insert -- of the --

Page 2
Column 2 item [56], Line 11, delete "Microlithographv" and insert -- Microlithography --

In the Specification

Column 1
Line 15, after "incorporated" delete "to"

Column 4
Line 58, after "during" delete "to"

Column 6
Line 8, delete "13/0,103,281" and insert -- 13/103,281 --

Column 6
Line 39, delete "13/0,103,281" and insert -- 13/103,281 --

Column 8
Line 36, after "scanning" delete "to"

Column 19
Line 54, after "505" insert -- . --

Column 25
Line 63, delete "cp" and insert -- φ --

Signed and Sealed this
Seventh Day of November, 2023

Katherine Kelly Vidal
*Director of the United States Patent and Trademark Office*

In the Claims

Column 30
Line 54, in Claim 21, delete "storing A" and insert -- storing a --